(12) United States Patent
Xia et al.

(10) Patent No.: US 11,924,682 B2
(45) Date of Patent: Mar. 5, 2024

(54) RESPONSE RECEIVING AND SENDING METHOD, RETRANSMISSION METHOD, COMMUNICATION DEVICE, AND STORAGE MEDIUM

(71) Applicant: ZTE CORPORATION, Guangdong (CN)

(72) Inventors: Shuqiang Xia, Guangdong (CN); Ting Fu, Guangdong (CN); Peng Hao, Guangdong (CN); Chunli Liang, Guangdong (CN); Min Ren, Guangdong (CN); Wei Gou, Guangdong (CN); Jing Shi, Guangdong (CN); Xianghui Han, Guangdong (CN)

(73) Assignee: ZTE CORPORATION (CN)

( * ) Notice: Subject to any disclaimer, the term of this patent is extended or adjusted under 35 U.S.C. 154(b) by 509 days.

(21) Appl. No.: 17/266,852

(22) PCT Filed: Aug. 12, 2019

(86) PCT No.: PCT/CN2019/100173
§ 371 (c)(1),
(2) Date: Feb. 8, 2021

(87) PCT Pub. No.: WO2020/030173
PCT Pub. Date: Feb. 13, 2020

(65) Prior Publication Data
US 2021/0297194 A1 Sep. 23, 2021

(30) Foreign Application Priority Data
Aug. 10, 2018 (CN) .......................... 201810910233.3

(51) Int. Cl.
H04L 1/1812 (2023.01)
H04L 1/1822 (2023.01)
(Continued)

(52) U.S. Cl.
CPC .......... *H04W 28/04* (2013.01); *H04L 1/1812* (2013.01); *H04L 1/1819* (2013.01);
(Continued)

(58) Field of Classification Search
CPC . H04L 1/0001–248; H04L 5/0001–26; H04W 8/22–245; H04W 24/02–10;
(Continued)

(56) References Cited

U.S. PATENT DOCUMENTS

2017/0367110 A1 12/2017 Li et al.
2018/0270807 A1* 9/2018 Salem .................. H04W 72/21
(Continued)

FOREIGN PATENT DOCUMENTS

| CN | 101378306 A | 3/2009 |
|---|---|---|
| CN | 101568181 | 10/2009 |

(Continued)

OTHER PUBLICATIONS

Lenovo et al., "HARQ design for uplink grant-free transmission," 3GPP Draft; R1-1712689, vol. RAN WG1, No. Prague, P.R. Czech; Aug. 21, 2017-Aug. 25, 2017, Aug. 2017, XP051315502.
(Continued)

*Primary Examiner* — Timothy J Weidner
(74) *Attorney, Agent, or Firm* — McDonald Hopkins LLC

(57) ABSTRACT

Provided are a response receiving and sending method, a retransmission method, a communication device, and a storage medium. The method includes: sending a transport block to a first communication device through a pre-configured period resource, and receiving a correct response corresponding to the transport block on a pre-configured correct response resource.

19 Claims, 10 Drawing Sheets

Receive a transport block sent by a second communication device through a pre-configured periodic resource — S201

Send a correct response corresponding to the transport block to the second communication device on a pre-configured correct response resource — S202

(51) Int. Cl.

| | |
|---|---|
| *H04L 1/1829* | (2023.01) |
| *H04L 1/1867* | (2023.01) |
| *H04L 5/00* | (2006.01) |
| *H04W 28/04* | (2009.01) |
| *H04W 28/06* | (2009.01) |
| *H04W 72/0446* | (2023.01) |
| *H04W 72/0453* | (2023.01) |
| *H04W 72/115* | (2023.01) |
| *H04W 72/23* | (2023.01) |
| *H04W 72/232* | (2023.01) |
| *H04W 84/02* | (2009.01) |
| *H04W 88/02* | (2009.01) |
| *H04W 88/08* | (2009.01) |
| *H04W 92/02* | (2009.01) |
| *H04W 92/10* | (2009.01) |

(52) U.S. Cl.
CPC .......... *H04L 1/1822* (2013.01); *H04L 1/1854* (2013.01); *H04L 1/1861* (2013.01); *H04L 1/1864* (2013.01); *H04L 1/1887* (2013.01); *H04L 1/1893* (2013.01); *H04L 1/1896* (2013.01); *H04L 5/0055* (2013.01); *H04L 5/0092* (2013.01); *H04W 28/06* (2013.01); *H04W 72/0446* (2013.01); *H04W 72/0453* (2013.01); *H04W 72/115* (2023.01); *H04W 72/23* (2023.01); *H04W 72/232* (2023.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ... H04W 28/02–26; H04W 72/02–569; H04W 74/002–008; H04W 76/10–50; H04W 84/02–16; H04W 88/02–12; H04W 92/02–04; H04W 92/10
See application file for complete search history.

(56) References Cited

U.S. PATENT DOCUMENTS

| | | | |
|---|---|---|---|
| 2018/0368117 A1* | 12/2018 | Ying | H04W 72/23 |
| 2019/0230691 A1* | 7/2019 | Cao | H04W 72/23 |

FOREIGN PATENT DOCUMENTS

| | | | | |
|---|---|---|---|---|
| CN | 102098151 A | | 6/2011 | |
| CN | 104272635 A | | 1/2015 | |
| CN | 106788912 | | 5/2017 | |
| CN | 108023671 | | 5/2018 | |
| CN | 108207020 | | 6/2018 | |
| CN | 108347321 | | 7/2018 | |
| CN | 108347321 A | * | 7/2018 | ............ H04W 72/04 |
| WO | 2018084559 | | 5/2018 | |

OTHER PUBLICATIONS

NTT Docomo et al., "Offline summary for AI 7.3.3.4. UL data transmission procedure," 3GPP Draft; R1-1801080, vol. RAN WG1, No. Vancouver, Canada; Jan. 2018, XP051385306.

CATT: "Remaining issues on grant-free UL transmission," 3GPP Draft; R1-1800260, vol. RAN WG1, No. Vancouver, Canada; Jan. 2018, XP051384738.

Qualcomm Incorporated: "Considerations on short periodicities of DL SPS for URLLC," 3GPP Draft; R1-1807366, vol. RAN WG1, No. Busan Korea; May 2018, XP051442558.

Supplementary European Search Report for Application 19846290.5, PCT/CN2018/100173, dated Mar. 23, 2022, 17 pgs., European Patent Office, Germany.

First Search Report; Chinese Patent Application No. 201810910233.3.

First Office Action; Chinese Patent Application No. 201810910233.3.

Huawei et al., "HARQ indication design for UL GF transmission;" 3 GPP TSG RAN WG1 Meeting #88bis, R1-1704223; Apr. 3, 2017.

Patent Cooperation Treaty (PCT), International Search Report and Written Opinion for Application PCT/CN2019/100173 filed on Aug. 12, 2019, dated Oct. 30, 2019, International Searching Authority, CN.

* cited by examiner

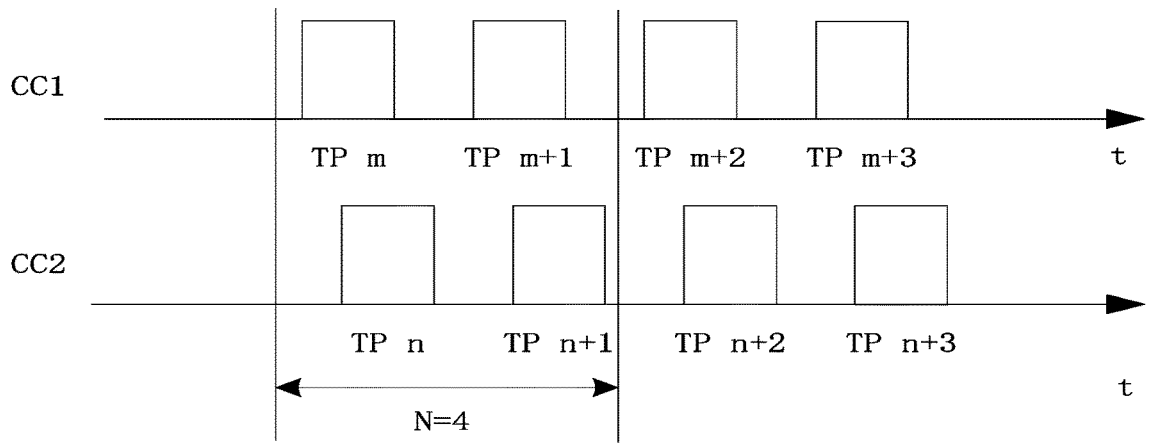
FIG. 8
| | | TB1 | | TB2 | | TB3 | | TB4 | | TB5 | | TB6 | | TB7 | | |
|---|---|---|---|---|---|---|---|---|---|---|---|---|---|---|---|---|
| Process index | | 0 | | 1 | | 2 | | 0 | | 1 | | 2 | | 0 | | |
| X | | 0 | | 4 | | 8 | | 12 | | 16 | | 20 | | 24 | | |
| Symbol index | 0 | 1 | 2 | 3 | 4 | 5 | 6 | 7 | 8 | 9 | 10 | 11 | 12 | 13 | 0 | 1 | 2 | 3 | 4 | 5 | 6 | 7 | 8 | 9 | 10 | 11 | 12 | 13 |
| Slot index | 0 | | | | | | | | | | | | | | 1 |
| Frame index | 0 |
FIG. 9
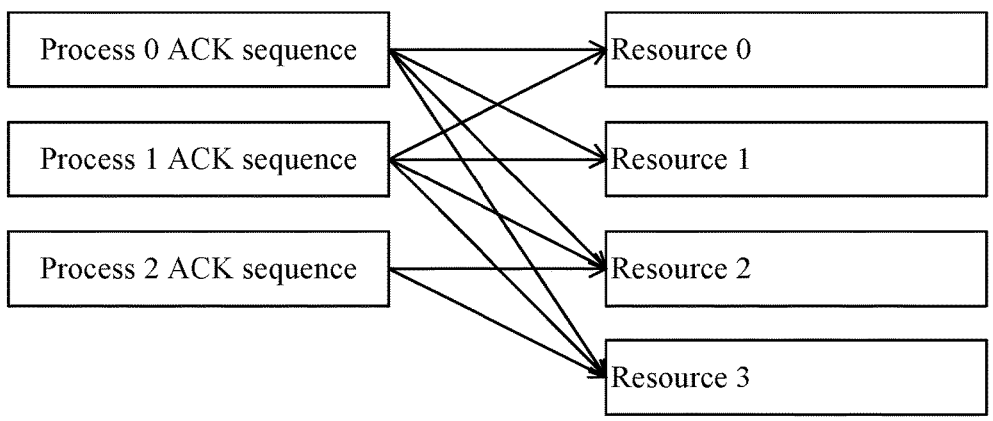
FIG. 10

RESPONSE RECEIVING AND SENDING METHOD, RETRANSMISSION METHOD, COMMUNICATION DEVICE, AND STORAGE MEDIUM

This application is a 35 U.S.C. 371 national stage filing of PCT Application No. PCT/CN2019/100173 filed on Aug. 12, 2019; which claims priority to Chinese Patent Application No. 201810910233.3 filed with the CNIPA on Aug. 10, 2018, the disclosures of each of which are incorporated herein by reference in their entireties.

TECHNICAL FIELD

The embodiments of the present disclosure relate to, but are not limited to, the field of communications and, in particular, to, but not limited to, a response receiving and sending method, a retransmission method, a communication device, and a storage medium.

BACKGROUND

In order to reduce the delay of the uplink data transmission and the overhead of the uplink scheduling, the communication system in the related art supports a scheduling-free data transmission method in which a terminal can send data by using resources configured by a base station every certain period. Since the time and the overhead of sending the scheduling request and receiving the scheduling grant sent by the base station before the data is sent are saved, the transmission delay and overhead of the transmission mode are greatly reduced compared with the scheduling-based mode in the related art, and the transmission mode is very suitable for services that are demanding or sensitive to the requirements of the delay.

However, with the continuous upgrading of the communication system, how to indicate whether the scheduling-free transport block (TB) is correctly detected in the fifth-generation mobile communication technology (5G) system has become an urgent problem to be solved.

SUMMARY

The response receiving and sending method, retransmission method, communication device, and storage medium provided by the embodiments of the present disclosure provide a method of implementing the indication of the transport block detection result in the 5G system.

The embodiments of the present disclosure provide a response receiving method. The method includes the steps described below.

A transport block is sent to a first communication device through a pre-configured period resource.

A correct response corresponding to the transport block is received on a pre-configured correct response resource.

The embodiments of the present disclosure further provide a response sending method. The method includes the steps described below.

A transport block sent by a second communication device is received through a pre-configured period resource.

A correct response corresponding to the transport block is sent to the second communication device on a pre-configured correct response resource.

The embodiments of the present disclosure further provide a retransmission method. The method includes the steps described below.

A transport block is sent to a first communication device through a pre-configured period resource.

Downlink control information (DCI) sent by the first communication device is received, where the DCI includes response information corresponding to N adjacent transmission periods in the time domain, where N is an integer greater than or equal to 1.

In response to the response information including an error response, a transport block sent in a transmission period corresponding to the error response is retransmitted to the first communication device.

The embodiments of the present disclosure further provide a retransmission method. The method includes the steps described below.

A transport block sent by a second communication device is received through a pre-configured period resource.

DCI is sent to the second communication device, where the DCI includes response information corresponding to N adjacent transmission periods in a time domain, where N is an integer greater than or equal to 1.

In response to the response information including an error response, a transport block retransmitted by the second communication device and sent in a transmission period corresponding to the error response is received.

The embodiments of the present disclosure further provide a communication device. The communication device includes a processor and a memory. The processor is configured to execute one or more first programs stored in the memory to implement the method described above, or the processor is configured to execute one or more second programs stored in the memory to implement the method described above, or the processor is configured to execute one or more third programs stored in the memory to implement the method described above, or the processor is configured to execute one or more fourth programs stored in the memory to implement the method described above.

The embodiments of the present disclosure further provide a storage medium. The storage medium is configured to store one or more first programs that, when executed by one or more processors, implement the method described above, or the storage medium is configured to store one or more second programs that, when executed by one or more processors, implement the method described above, or the storage medium is configured to store one or more third programs that, when executed by one or more processors, implement the method described above, or the storage medium is configured to store one or more fourth programs that, when executed by one or more processors, implement the method described above.

BRIEF DESCRIPTION OF DRAWINGS

FIG. 4-1 is a schematic diagram of the first mapping of a correct response sequence to a REG;

FIG. 4-2 is a schematic diagram of the second mapping of a correct response sequence to a REG;

FIG. 4-3 is a schematic diagram of the third mapping of a correct response sequence to a REG;

FIG. 4-4 is a schematic diagram of the fourth mapping of a correct response sequence to a REG;

FIG. 8 is a schematic diagram of N transmission periods according to Embodiment five of the present disclosure;

FIG. 9 is a schematic diagram of a correspondence between a period resource and a slot according to Embodiment six of the present disclosure;

FIG. 10 is a schematic diagram of a correct response resource allocated for an ACK sequence according to Embodiment of the present disclosure;

DETAILED DESCRIPTION

The embodiments of the present disclosure will be further described in detail through specific implementations with reference to the drawings. It should be understood that the embodiments described herein are only for explaining the present disclosure, but not for limiting the present disclosure.

Embodiment One

Figure 1:
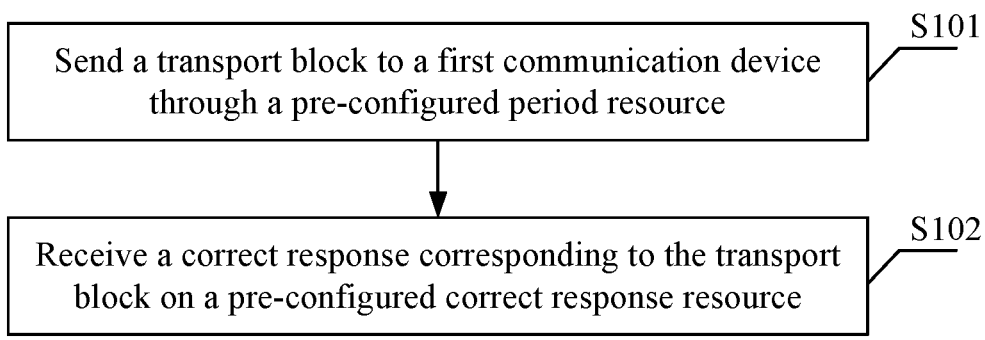
FIG. 1 is a flowchart of a response receiving method according to Embodiment one of the present disclosure.

The embodiment of the present disclosure provides a response receiving method. With reference to FIG. 1, the method is applied to a second communication device and includes the steps described below.

In S101, a transport block is sent to a first communication device through a pre-configured period resource.

The period resource in the embodiment may be configured by the first communication device for the second communication device, and the second communication device may send a transport block to the first communication device in a transmission period corresponding to the period resource.

In S102, a correct response corresponding to the transport block is received on a pre-configured correct response resource.

According to the response receiving and sending method, the retransmission method, the communication device, and the storage medium provided in the embodiments of the present disclosure, a transport block is sent to the first communication device through a pre-configured period resource, and a correct response corresponding to the transport block is received on the pre-configured correct response resource. In some implementations, a detection result of the transport block can be indicated by the correct response. Since the correct response sent by the first communication device can be received, it is possible to determine whether the transport block detection result is correct based on the correct response. Therefore, the method can indicate that the transport block is correctly detected based on the correct response, and further improve the accuracy of the indication result, compared with the method in which whether the transport block detection result is correct is indicated only by uplink authorization in the related art.

It is to be noted that in the embodiment of the present disclosure, the first communication device may be a base station, and the second communication device may be a terminal, or the first communication device may be a terminal, and the second communication device may be a base station.

For step S102, specifically, the correct response sent by the first communication device may be acquired by detecting the transport block. Therefore, if the detection result is incorrect, the second communication device may further receive an error response sent by the first communication device. It is to be noted that the error response in the embodiment may be any response sent by the first communication device to the second communication device that indicates that the transport block is not correctly detected by the first communication device.

When the second communication device receives the correct response, it can be determined that the transport block corresponding to the correct response is correctly detected by the first communication device. Then the second communication device does not need to retransmit the transport block corresponding to the correct response so that the waste of resources can be reduced.

In a first example, timing may be started at a time corresponding to the transport block, and in response to detecting the correct response corresponding to the transport block within a preset timing period T1, the timing is continued, and a new transport block is prohibited from being sent to the first communication device through the period resource having a same process index of the transport block within the preset timing period T1. Of course, after the end of the preset timing period T1, a new transport block may be allowed to be sent to the first communication device through the period resource having the same process index of the transport block.

T1 in the embodiment may be arbitrarily set, for example, T1 may be 14 symbols, 16 symbols, or the like.

In a second example, timing may be started at a time corresponding to the transport block, and in response to detecting the correct response corresponding to the transport block within a preset timing period T1, the timing is stopped, and a new transport block is allowed to be sent to the first communication device through the period resource having a same process index of the transport block.

In a third example, timing is started at a time corresponding to the transport block. In response to not detecting the correct response and an error response corresponding to the transport block within a preset timing period T1, the timing is continued, and a new transport block is prohibited from being sent to the first communication device through the period resource having a process index of the transport block within the preset timing period T1. But the transport block may be allowed to be re-sent to the first communication device through the period resource having the same process index of the transport block. Of course, after the end of the preset timing period T1, a new transport block may be allowed to be sent to the first communication device through the period resource having the same process index of the transport block, or if this transport block has not been retransmitted within the preceding preset timing period T1, this transport block may be re-sent to the first communication device through the period resource corresponding to the period resource having the same process index of the transport block or a period resource corresponding to another process index after the end of the preset timing period T1.

In a fourth example, timing is started at a time corresponding to the transport block. In response to detecting an error response corresponding to the transport block within a preset timing period T1, the timing is re-started, and a new transport block is prohibited from being sent to the first communication device through the period resource having a same process index of the transport block within the re-timed preset timing period T1. But the transport block may be allowed to be re-sent to the first communication device through the period resource having the same process index of the transport block. Of course, after the end of the preset timing period T1, a new transport block may be allowed to be sent to the first communication device through the period resource having the same process index of the transport block.

It is to be noted that the time corresponding to the transport block mentioned in the embodiment may be any one of the following times:

a sending start time of the transport block;
a sending end time of the transport block;
a generation time of the transport block; or
a generation time of a protocol data unit corresponding to the transport block.

In a first embodiment, step S120 may include: receiving downlink control information (DCI) sent by the first communication device on the pre-configured correct response resource. The correct response is carried in the DCI, and one DCI includes one correct response. The correct response is represented by a hybrid automatic repeat request (HARQ) process index field in the DCI and at least one of a resource allocation field, a redundancy version field, a coding and modulation field, a new data indication field or a transmit power control field in the DCI. The HARQ process index field is the process index of the transport block.

Specifically, when a correct response is represented, all bits of the resource allocation field in the DCI are 1 or 0, all bits of the redundancy version field are 1, and all bits of the coding and modulation field are 0; or, all bits of the resource allocation field are 1 or 0, all bits of the redundancy version field are 0, and all bits of the coding and modulation field are 0; or, all bits of the resource allocation field are 1 or 0, all bits of the redundancy version field are 1, and all bits of the coding and modulation field are 1; or, all bits of the resource allocation field are 1 or 0, and all bits of the redundancy version field are 1; or, all bits of the resource allocation field are 1 or 0, and all bits of the redundancy version field are 0.

Of course, in other embodiments, a correct response may also be represented by setting all bits of the new data indication field to 0 or 1 or setting all bits of the transmit power control field to 0 or 1.

In a second embodiment, step S102 may include: receiving a DCI sent by the first communication device on the pre-configured correct response resource. The correct response is carried in the DCI, and one DCI includes a correct response. The correct response is represented by a target bit in the DCI and a HARQ process index field in the DCI. The HARQ process index field is the process index of the transport index.

The target bit in the embodiment may be a 1-bit, a 2-bit, a 3-bit, or the like in the DCI. Specifically, the target bit may be a ninth bit in the DCI, that is, the ninth bit in the DCI indicates the correct response. For example, when the ninth bit is 0, the ninth bit may represent the correct response, and when the ninth bit is 1, the ninth bit may represent the error response. In a third embodiment, step S102 may include: receiving a correct response sequence sent by the first communication device on the pre-configured correct response resource.

After the second communication device receives the correct response sequence, the second communication device may determine, according to the pre-configured correspondence between the correct response sequence and the process index of the second communication device, that the transport block corresponding to the process index corresponding to the correct response sequence is correctly detected by the second communication device.

Finally, it is to be noted that the response receiving method provided in the embodiment can be applied to not only the 5G communication system, but also the third generation mobile communication system, the fourth generation mobile communication system, and other communication systems.

Through the response receiving method provided by the embodiment, the second communication device can determine, based on the received correct response, that the transport block corresponding to the correct response is correctly detected by the first communication device, and can further prevent the first communication device from missing detecting the transport block and the second communication device from recognizing that the transport block is correctly detected.

Embodiment Two

Figure 2:
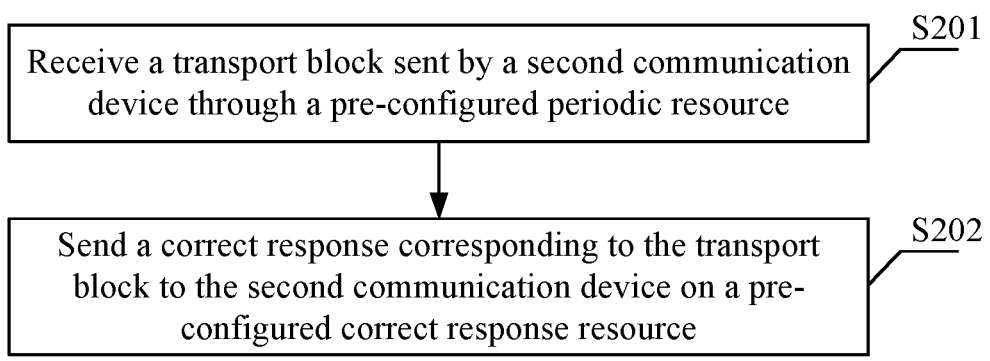
FIG. 2 is a flowchart of a response sending method according to Embodiment two of the present disclosure.

The embodiment provides a response sending method. Referring to FIG. 2, the method is applied to a first communication device, and includes the steps described below.

In S201, a transport block sent by a second communication device through a pre-configured periodic resource is received.

Similarly, in the embodiment of the present disclosure, the first communication device may be a base station, the second communication device may be a terminal, or the first communication device may be a terminal, and the second communication device may be a base station.

In S202, a correct response corresponding to the transport block is sent to the second communication device on a pre-configured correct response resource.

Specifically, in step S202, the first communication device may send a correct response corresponding to the transport block to the second communication device after the transport block is correctly detected.

It is to be noted that, before step S201, the first communication device may further configure the maximum number K of processes for the second communication device, and configure a corresponding transmission period P for the period resource configured for the second communication device, where K is an integer greater than or equal to 1, and p is greater than 0. In this point, the first communication device may send the correct response corresponding to the transport block to the second communication device within K*P time after the transport block is detected.

In a first embodiment, step S202 may include: sending a DCI to the second communication device on the pre-configured correct response resource, where the correct response is carried in the DCI. Furthermore, an HARQ process index field in the DCI is set to a process index of the transport block, and at least one of a resource allocation field, a redundancy version field, a coding and modulation field, a new data indication field or a transmit power control field in the DCI is set to represent the correct response.

Specifically, at least one of the resource allocation field, the redundancy version field, the coding and modulation field, the new data indication field or the transmit power control field in the DCI is configured in the following manner: setting all bits of the resource allocation field to 1 or 0, setting all bits of the redundancy version field to 1, and setting all bits of the coding and modulation field to 0; setting all bits of the resource allocation field to 1 or 0, setting all bits of the redundancy version field to 0, and setting all bits of the coding and modulation field to 0; setting all bits of the resource allocation field to 1 or 0, setting all bits of the redundancy version field to 1, and setting all bits of the coding and modulation field to 1; setting all bits of the resource allocation field to 1 or 0, and setting all bits of the redundancy version field to 1; or setting all bits of the resource allocation field to 1 or 0, and setting all bits of the coding and modulation field to 0.

Of course, in other embodiments, a correct response may also be represented by setting all bits of the new data indication field to 0 or 1 or setting all bits of the transmit power control field to 0 or 1. The reverse representation of the correct response can be used for representing the error response.

It is to be noted that the operation of setting all bits of the resource allocation field to 1 or 0 ma specifically include: in response to a resource allocation method corresponding to the resource allocation field in the DCI being a bitmap, setting all bits of the resource allocation field to 0, and in response to the resource allocation method corresponding to the resource allocation field in the DCI being not a bitmap, setting all bits of the resource allocation field to 1.

In a second embodiment, step S202 may include: sending a DCI to the second communication device on the pre-configured correct response resource, where the correct response is carried in the DCI. Furthermore, the correct response is represented by setting the target bit (that is, the specific bit) in the DCI by setting the HARQ process index field in the DCI as the process index of the transport block.

The target bit in the embodiment may be a 1-bit, a 2-bit, a 3-bit, or the like in the DCI. Specifically, the target bit may be a ninth bit in the DCI, that is, the ninth bit in the DCI is set to represent the correct response. For example, the ninth bit of the DCI may be set to 1 to represent the correct response, and the ninth bit of the DCI may be set to 0 to represent the error response. It is to be noted that when some fields or the target bit in the DCI are used to represent the response information such as acknowledgement (ACK) and negative acknowledgement (NACK), the number of bits included in the DCI carrying the ACK information may be equal to that of the DCI carrying the NACK. The HARQ process index field represents the process index corresponding to the transport block, and other fields are set to a first specified value (for example, "0") or not defined (may be "0" or "1"). If the some fields or the target bit in the DCI represent the NACK, the preceding bits are set to a second specified value (for example, "1"). For the preceding two embodiments, the DCI sent by the first communication device to the second communication device may be a DCI scrambled by a configured scheduling radio network temporary identifier (CS-RNTI).

In s third embodiment, the correct response may be represented by the correct response sequence, and step S202 may include: determining a correct response sequence corresponding to the process index of the transport block and a correct response resource for sending the correct response sequence, mapping the correct response sequence to the correct response resource for sending to the second communication device.

It is to be noted that in other embodiments, the correct response sequence corresponding to each process index may have been pre-configured, and in this point, for step S202, the correct response sequence corresponding to the process index may be directly sent according to the situation of the pre-configuration.

In the third embodiment, before step S202, the first communication device may configure a monitoring period for the second communication device to monitor whether the correct response is received, where the monitoring period includes a correct response sequence for representing the correct response and a correct response resource for sending the correct response sequence.

Optionally, in this embodiment, the first communication device may send response information within the time T1 after the transport block sent by the terminal is detected. The response information includes one of a correct response and an error response.

The scenario in the third embodiment described above will be further described below.

The correct response sequence configured for the second communication device may be in a one-to-one correspondence to the process index of the second communication device. In this point, the number of correct response sequences is equal to the maximum number of processes configured by the first communication device for the second communication device.

The monitoring period of the correct response configured for the second communication device may be equal to a monitoring period of a physical downlink control channel (PDCCH) configured for the second communication device.

When at least two correct response resources for sending the correct response sequence are configured for the first communication device, the plurality of correct response resources may include the same number of resource elements (REs).

When at least two correct response resources for sending the correct response sequence are configured for the first communication device, the at least two correct response resources may include the same number of time domains, and the plurality of correct response resources may include the same number of sub-carriers.

When at least two correct response sequences are configured for the second communication device, the at least two correct response sequences may share one correct response resource.

The correct response resource can be composed of resource element groups (REGs).

For the scenario in the third embodiment, the correct response sequence may be mapped to the correct response resource in one of the following mapping manners.

Figure 3:
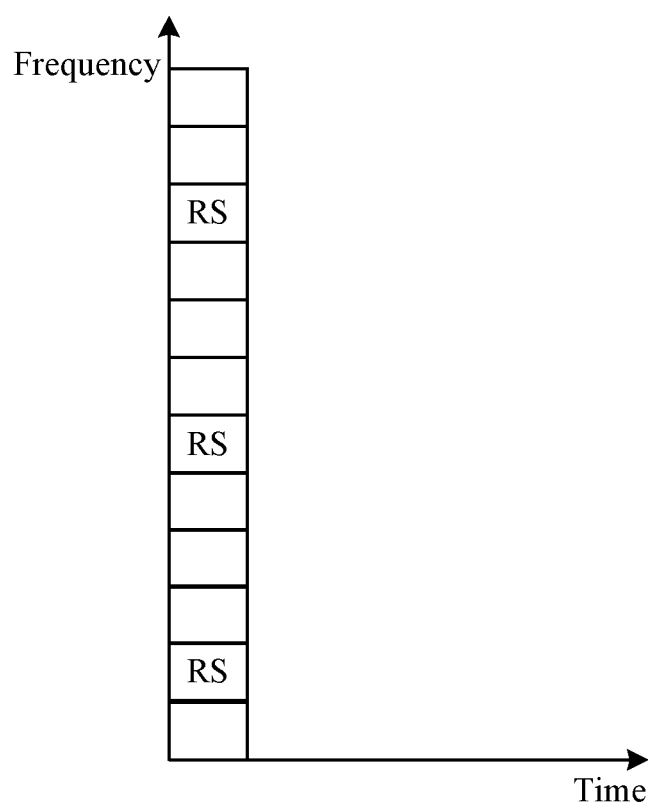
FIG. 3 is a schematic diagram of a REG according to Embodiment two of the present disclosure.
Figures 1, 4:
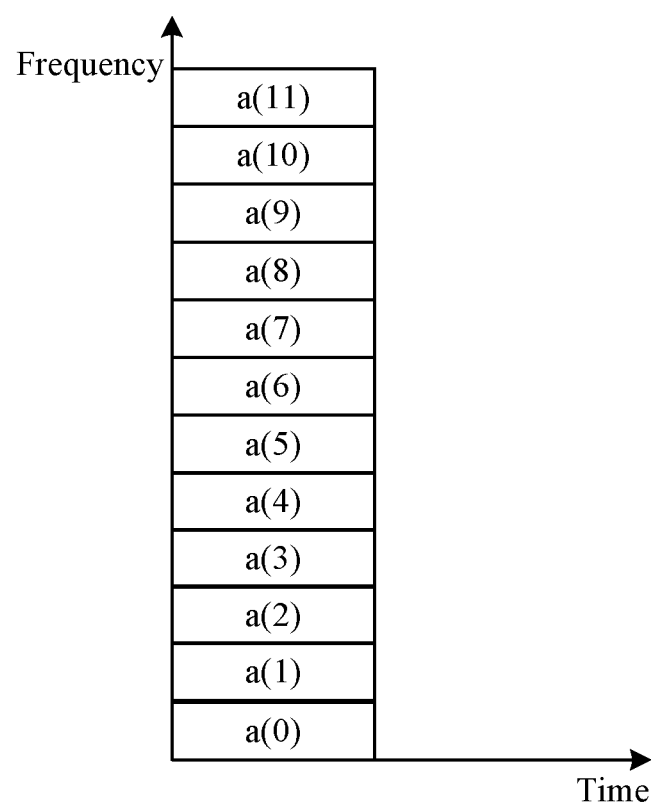
Figures 2, 4:
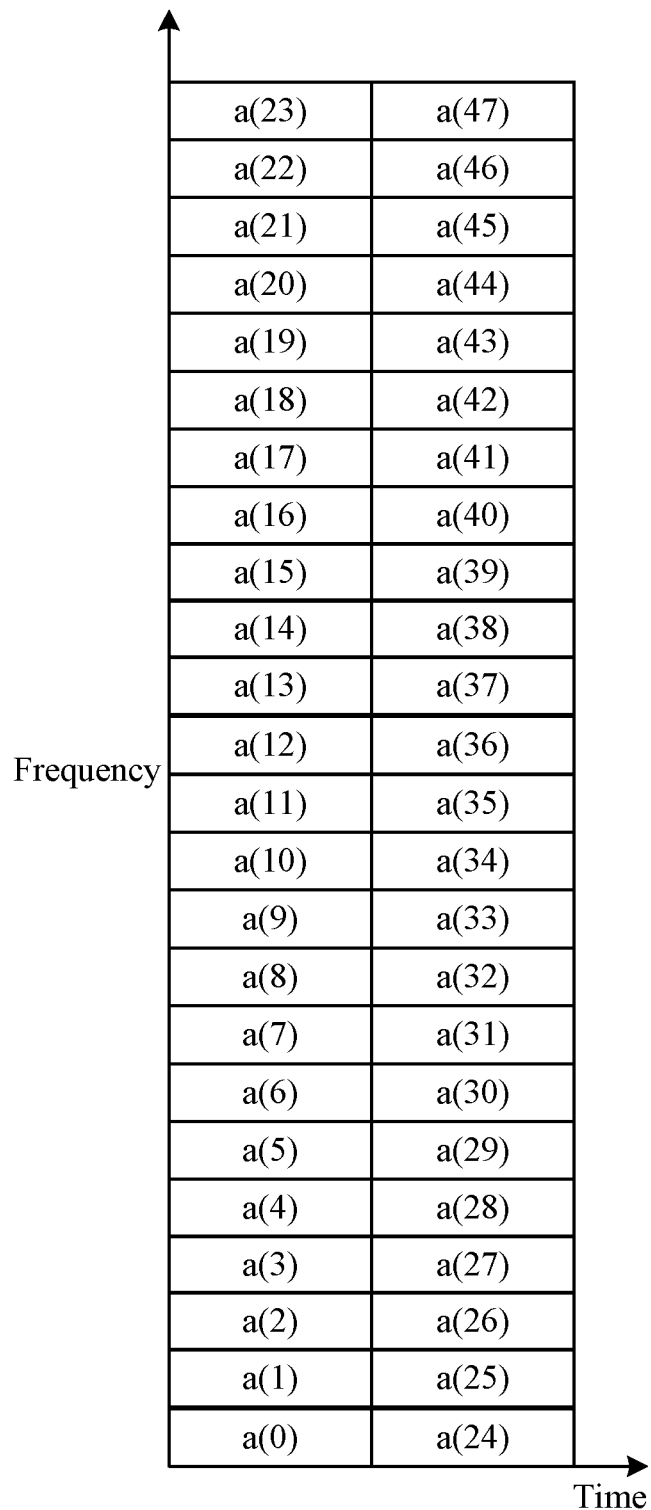
Figures 3, 4:
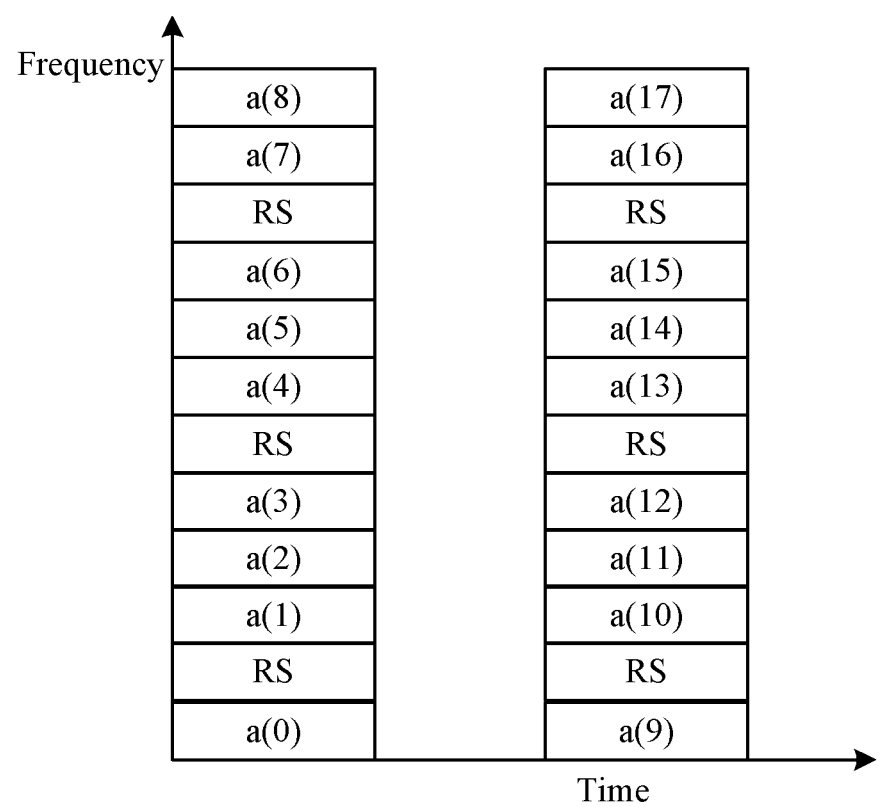
Figure 4:
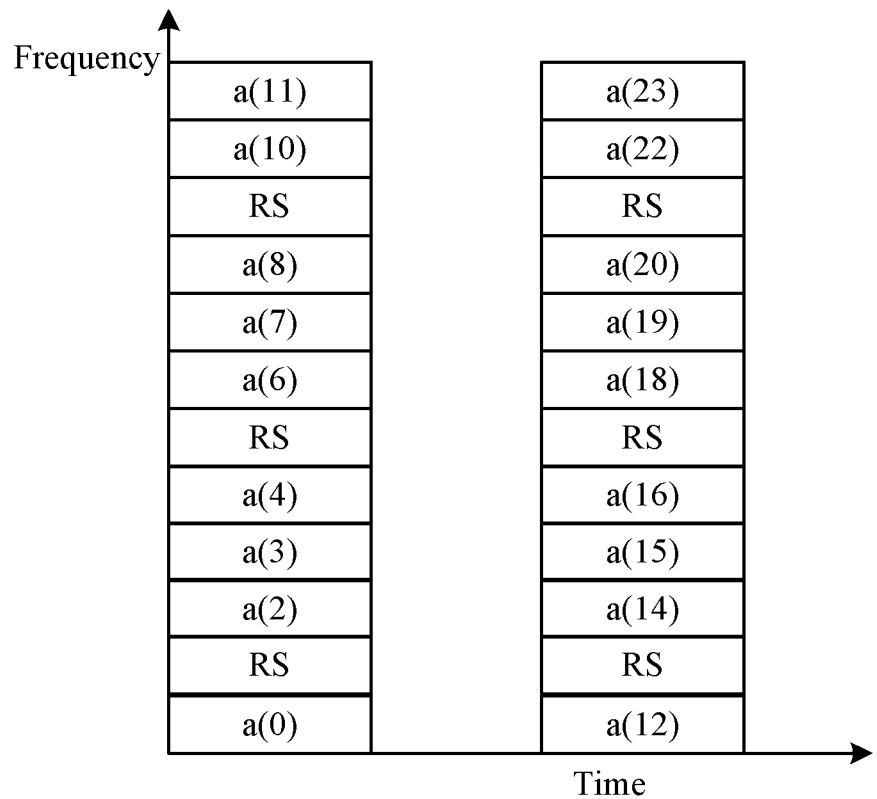

In manner 1, in response to the correct response resource being composed of one REG, the correct response sequence is mapped to the REG in a preset order of frequency sizes, where during the mapping, the correct response sequence is mapped to a resource used for sending a reference signal in the REG and to a resource not used for sending the reference signal in the REG. The preset order of frequency sizes mentioned in the embodiment may be a descending order of frequencies, an ascending order of frequencies, or another order. In a 5G system, one REG has one symbol in the time domain and 12 sub-carries in the frequency domain. Assuming that the sub-carrier indexes are 1, 2, . . . , and 11, respectively, the first, fifth, and ninth sub-carriers are the locations for sending the reference signal. With reference to FIG. 3, FIG. 3 is a schematic diagram of a REG, in which RS denotes the reference signal. When the correct response sequences in FIG. 3 are mapped in this manner, for the schematic diagram of the mapping of the correct response sequences, the reference may be to FIG. 4-1. That is, a(0), a(1), . . . , and a(11) are mapped to the REG in ascending order of frequencies, and during the mapping, the resource for sending the reference signal on the REG is not skipped, that is, the reference signal is not sent on the resource corresponding to the reference signal in the REG.

In manner 2, in response to the correct response resource being composed of one REG, the correct response sequence is mapped to the REG in a preset order of frequency sizes, where during the mapping, a resource used for sending a reference signal in the REG is skipped. Similarly, the preset order of frequency sizes mentioned in this manner may be a descending order of frequencies, an ascending order of frequencies, or another order.

In manner 3, in response to the correct response resource being composed of at least two REGs and the at least two REGs being in different time domains, the correct response sequence is mapped to the at least two REGs in an order of a time domain followed by a frequency domain or in an order of a frequency domain followed by a time domain, where during the mapping, the correct response sequence is mapped to a resource used for sending a reference signal in the at least two REGs and to a resource not used for sending the reference signal in the at least two REGs.

In manner 4, in response to the correct response resource being composed of at least two REGs and the at least two REGs being in different time domains, the correct response sequence is mapped to the at least two REGs in an order of a time domain followed by a frequency domain or in an order of a frequency domain followed by a time domain, where during the mapping, a resource used for sending a reference signal in the at least two REGs is skipped.

In manner 5, in response to the correct response resource being composed of at least two REGs and the at least two REGs being continuous in the time domain or in the frequency domain, the correct response sequence is mapped to the at least two REGs in an order of the time domain followed by the frequency domain or in an order of the frequency domain followed by the time domain, where during the mapping, the correct response sequence is mapped to a resource used for sending a reference signal in the at least two REGs and to a resource not used for sending the reference signal in the at least two REGs. With the example described in the above-mentioned manner 1, for the schematic diagram of the mapping of the correct response sequence in this manner, the reference may be made to FIG. 4-2.

In manner 6, in response to the correct response resource being composed of at least two REGs and the at least two REGs being discontinuous in the time domain and in the frequency domain, the correct response sequence is mapped to the at least two REGs in an order of the time domain followed by the frequency domain or in an order of the frequency domain flowed by the time domain, where during the mapping, a resource used for sending a reference signal in the at least two REGs is skipped.

It is assumed that the correct response resource is composed of M REGs and the M REGs include a rectangular resource. If the rectangular resource is composed of p symbols×q carriers, where p and q are positive integers, when the condition of p*q=12M is satisfied, the M REGs are continuous. In this point, the above manner 5 may be used for mapping. When the condition of p*q=12M is not satisfied, the M REGs are discontinuous. In this point, the above manner 6 may be used for mapping.

It is to be noted that in the above multiple manners, in the case that the resource used for sending the reference signal on the REG is skipped during the mapping, if there is a resource corresponding to the reference signal during mapping, the element constituting the correct response sequence may be automatically mapped to the next available resource, or the element may be discarded. For example, with reference to FIG. 4-3, the correct response resource in FIG. 4-3 includes two discontinuous REGs, and when there is a resource corresponding to the reference signal during mapping, the element is automatically mapped to the next resource. Similarly, the correct response resource in FIG. 4-4 includes two discontinuous REGs, and when there is a resource corresponding to the reference signal during the mapping, the element is discarded.

In the embodiment, the correct response resource may correspond to a resource occupied by one PDCCH in the PDCCH search space of the second communication device. Of course, in other embodiments, the correct response resource may correspond to resources occupied by a plurality of PDCCHs in the PDCCH search space of the second communication device.

In one embodiment, the operation of mapping the correct response sequence to the correct response resource when the correct response resource corresponds to the resource occupied by the PDCCH in the PDCCH search space of the second communication device includes the following step.

The correct response sequence is mapped to the resource occupied by the PDCCH according to a type of mapping of a control channel element (CCE) in the resource occupied by the one PDCCH to the REG.

Specifically, in response to the type of the mapping of the CCE to the REG being an interleaving type, the correct response sequence may be mapped to an REG in a candidate location of the PDCCH, where during the mapping, a resource used for sending a reference signal in the REG is skipped. In response to the type of the mapping of the CCE to the REG being a non-interleaving type, the correct response sequence may be mapped to an REG in a candidate location of the PDCCH, where during the mapping, the correct response sequence is mapped to the resource used for sending the reference signal in the REG and to a resource not used for sending the reference signal in the REG. Of course, in other embodiments, in response to the type of the mapping of the CCE to the REG being a non-interleaving type, the correct response sequence may be mapped to the REG in the candidate location of the PDCCH, where during the mapping, the resource used for sending the reference signal on the REG is skipped. In response to the type of the mapping of the CCE to the REG being an interleaving type, the correct response sequence may be mapped to the REG in the candidate location of the PDCCH, where during the mapping, the correct response sequence may be mapped to the resource used for sending the reference signal on the REG and to the resource not used for sending the reference signal on the REG.

In other embodiment, the operation of mapping the correct response sequence to the correct response resource when the correct response resource corresponds to the resource occupied by the PDCCH in the PDCCH search space of the second communication device includes the following steps.

Aggregation levels corresponding to a plurality of PDCCHs in the PDCCH search space of the second communication device are acquired.

The correct response sequence is mapped to the resource occupied by the PDCCH according to the aggregation levels corresponding to the plurality of PDCCHs.

It is to be noted that the resource occupied by one PDCCH includes p CCEs, where p is one of {1, 2, 4, 8, 16, 32}, and accordingly, the aggregation level of this PDCCH is referred to as p. In the embodiment, the aggregation level may be configured by the first communication device and notified to the second communication in advance.

The step in which the correct response sequence is mapped to the resource occupied by the PDCCH according to the aggregation levels corresponding to the plurality of PDCCHs includes the following step.

An aggregation level is selected from the aggregation levels corresponding to the plurality of PDCCHs. In response to the aggregation level being less than or equal to a preset threshold, the correct response sequence is mapped to a first-type resource in the resource occupied by the PDCCH or the correct response sequence is mapped to the first-type resource and a second-type resource in the resource occupied by the PDCCH. In response to the aggregation level being greater than the preset threshold, the correct response sequence is mapped to the second-type resource in the resource occupied by the PDCCH. The first-type resource is a resource not corresponding to a reference signal in the resource occupied by the PDCCH, and the second-type resource is a resource corresponding to the reference resource in the resource occupied by the PDCCH.

The preset threshold in the embodiment can be flexibly set by the developer.

Specifically, the manner of selecting the aggregation level from the aggregation levels corresponding to the plurality of PDCCHs includes, but is not limited to, one of the following manners.

The maximum aggregation level is selected from the aggregation levels corresponding to the plurality of PDCCHs.

The minimum aggregation level is selected from the aggregation levels corresponding to the plurality of PDCCHs.

When the number of corresponding PDCCHs in the search space is R, an aggregation level that ranks Q-th is selected from the aggregation levels corresponding to the plurality of PDCCHs, where R and Q are integers, R is greater than or equal to 3, (R−Q) is greater than zero and less than (R−1).

It is to be noted that the ranking may be performed in a descending order, or may be performed in an ascending order.

Finally, it is to be noted that the response sending method provided in the embodiment can be applied to not only the 5G communication system, but also the third generation mobile communication system, the fourth generation mobile communication system, and other communication systems.

Through the response sending method provided by the embodiment, the first communication device may send a correct response to the second communication device, and the second communication device may determine, based on the received correct response, that the transport block corresponding to the correct response is correctly detected by the first communication device, thereby preventing occurrence of a case in which the first communication device misses detecting the transport block while the second communication device determines that the transport block is correctly detected.

Embodiment Three

How to implementing the indication of uplink transmission cancel or stop in the 5G system is also a problem to be solved urgently.

Therefore, the embodiment provides a new method for sending an uplink transmission cancel or stop indication, hereinafter referred to as UL PI. Specifically, the first communication device in the embodiment may send the UL PI to the second communication device, and the following is specifically described by using an example in which the base station sends the UL PI to the terminal.

The uplink transmission in the embodiment includes, but is not limited to, at least one of the following uplink transmission signals:

A physical uplink shared channel (PUSCH), a physical uplink control channel (PUCCH), a sounding reference signal (SRS), and a physical random access channel (PRACH).

The method of sending the UL PI to the terminal by the base station in the embodiment and the method of representing the UP PI may refer to the method of sending the correct response and the method of representing the correct response in the above embodiments, respectively.

For example, the UL PI may be carried in the DCI and then sent to the terminal. Specifically, at least one of a resource allocation field, a redundancy version field, a coding and modulation field, a new data indication field, or a transmit power control field in the DCI is set to represent the UL PI. Alternatively, the correct response is represented by setting the specific bits in the DCI.

Specifically, for the setting of the above multiple fields, the reference may be made to the above embodiment, and details will not be described herein.

For another example, the UL PI may be represented by an indication sequence. Specifically, the base station may re-configure for the terminal a monitoring period for monitoring whether the indication sequence is received. Within the monitoring period, there is an indication sequence for indicating the uplink transmission cancel or stop and a sequence resource for sending the indication sequence. Compared with the implementation of the UL PI indication in the DCI manner, the implementation of the UL PI indication in the sequence manner can implement the same function with smaller resources, thereby avoiding the blocking of DCI and improving the system resource utilization.

When the base station sends the indication sequence, specifically, the base station may map the indication sequence to a corresponding sequence resource and then send the indication sequence. It is to be noted that when there is both the indication sequence and the correct response sequence in the above embodiment in one communication system, the sequence resource corresponding to the correct response sequence and the sequence resource corresponding to the indication sequence may be different from each other.

In the embodiment, the features of the sequence resource corresponding to the indication sequence may be the same as the features of the sequence resource corresponding to the correct response sequence in the above embodiment, and details will not be described herein. Similarly, the manner of mapping the indication sequence to the sequence resource may be the same as the manner of mapping the correct response sequence to the sequence resource in the above embodiment, and details will not be described herein.

It is to be noted that different processes may correspond to different indication sequences, and the base station may, according to the uplink transmission corresponding to a process that need to be canceled, send the indication sequence corresponding to the process to the terminal. Of course, when the indication sequence is represented by the DCI, the HARQ process index field may be set to an index corresponding to the process that needs to be canceled. When the terminal receives the UL PI, the terminal cancels or stops the uplink transmission of the corresponding process.

The UL PI in the embodiment may be a UE-specific UL PI for indicating that the uplink transmission of one terminal is canceled or stopped, and optionally, the latest uplink transmission including the ongoing uplink transmission is canceled or stopped, or all previous scheduled uplink transmissions are canceled or stopped, or the uplink transmission in the reference uplink resource (RUR) indicated by the UL PI is canceled or stopped.

In the embodiment, the UL PI may be a Group common UL PI for indicating that the uplink transmission of one group of terminals is canceled or stopped. That is, in this point, the base station may send the Group common UL PI to a plurality of terminals, and optionally, the latest uplink transmission of each of the terminals in the one group of terminals including the ongoing uplink transmission is canceled or stopped, or all previous scheduled uplink transmissions of all the terminals in the one group of terminals are canceled or stopped, or the uplink transmission in the RUR indicated by the UL PI is canceled or stopped.

Finally, it is to be noted that the method for sending the uplink transmission cancel or stop indication provided in the embodiment can be applied to not only the 5G communication system, but also the third generation mobile communication system, the fourth generation mobile communication system, and other communication systems.

Embodiment Four

In the conventional communication system, the terminal can retransmit the transport block to the base station only after receiving the uplink grant sent by the base station, so when the transport block should be retransmitted in the 5G system to ensure the communication quality has also become a new problem.

Figure 5:
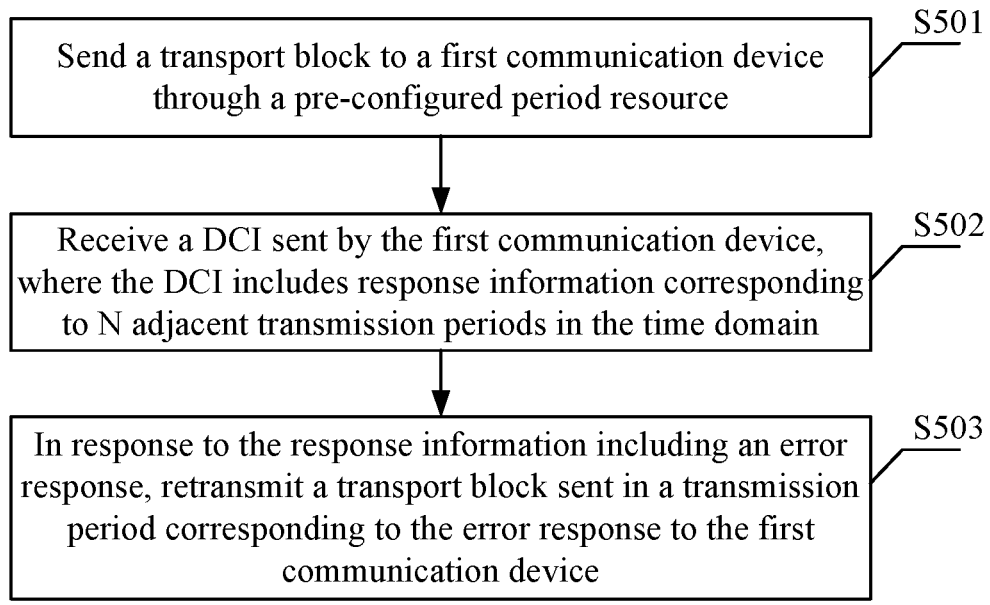
FIG. 5 is a flowchart of a retransmission method according to Embodiment four of the present disclosure.

The embodiment provides a new retransmission method, in which whether to retransmit the transport block is indicated through the error response. With reference to FIG. 5, the method is applied to a second communication device and includes the steps described below.

In S501, a transport block is sent to a first communication device through a pre-configured period resource.

The period resource in the embodiment may be configured by the first communication device for the second communication device, and the second communication device may send a transport block to the first communication device in a transmission period corresponding to the period resource.

In S502, a DCI sent by the first communication device is received, where the DCI includes response information corresponding to N adjacent transmission periods in the time domain.

In the embodiment, N is an integer greater than or equal to 1. That is, the N pieces of response information corresponding to the N transmission periods are collectively carried in one DCI. In particular, when N is greater than or equal to 2, communication resources may be relatively saved.

In S503, in response to the response information including an error response, a transport block sent in a transmission period corresponding to the error response is retransmitted to the first communication device.

Specifically, the first communication device in the embodiment may send an error response and an uplink grant to the second communication device. Specifically, the first communication device may send an error response to the second communication device when detecting a transport block error, and sends an uplink grant. In the embodiment, the second communication device may perform the retransmission operation in one of the following manners.

In manner 1, if the second communication device receives the uplink grant for scheduling the retransmission of the transport block within the pre-configured timer time, the second communication device retransmits the corresponding transport block according to the instruction of the uplink grant. If the second communication device does not receive the uplink grant within the pre-configured timer time but receives the DCI, the second communication device autonomously retransmits the transport block receiving the error response after the pre-configured timer time expires.

In manner 2, within the pre-configured timer time, if the second communication device first receives the DCI, the second communication device autonomously retransmits the corresponding transport block receiving the error response. Specifically, the second communication device does not need to wait for the expiry of the timer time or the uplink grant, and may autonomously retransmit the transport block corresponding to the error response when receiving the DCI. Of course, the second communication device may also determine the retransmission occasion according to another manner. If the second communication device subsequently receives the uplink grant corresponding to the transport block, the second communication device may choose to retransmit the transport block again according to the instruction of the uplink grant or ignore the uplink grant.

In manner 3, within the pre-configured timer time, if the second communication device first receives the uplink grant for scheduling the retransmission of the transport block, the second communication device retransmits the corresponding transport block according to the instruction of the uplink grant. If the second communication device subsequently receives the DCI, the second communication device may choose to retransmit the transport block corresponding to the error response in the DCI again, or may choose not to retransmit the transport block corresponding to the error response in the DCI.

In manner 4, within the pre-configured timer time, the second communication device does not receive the uplink grant corresponding to a transport block actually transmitted, and does not receive the DCI corresponding to this transport block. The second communication device may autonomously retransmit this transport block after the timer time expires.

The above retransmission operation can further ensure that the transport block that is not detected or is detected to be error is retransmitted to the first communication device, thereby ensuring the communication reliability.

It is to be noted that the timing start time corresponding to the timer in the embodiment may be the time at which the second communication device sends the corresponding transport block. There are various manner of autonomous retransmission in the embodiment, including but not limited to one of the following manners.

In manner 1, there is no binding relationship between the autonomous retransmission and the first transmission of the transport block. During autonomous retransmission, the second communication device autonomously selects a period resource and re-sends the transport block as a new transport block. The first communication device cannot associate the autonomous retransmission with the first transmission of the transport block, and thus the autonomous retransmission with the first transmission of the transport block cannot demodulated in the combined manner but only be demodulated independently.

In manner 2, the binding relationship between the autonomous retransmission and the first transmission of the transport block is configured by a higher layer, for example, by a MAC (physical) layer or an RCC layer, or by a DCI. For example, the timing relationship between the autonomous retransmission and the first transmission of the transport block is configured through a MAC message or an RRC message or a DCI. The second communication device, after receiving the DCI, autonomously retransmits the transport block sent within the transmission period (TP) corresponding to the corresponding error response. The period resource used for autonomous retransmission is determined according to the timing relationship between the autonomous retransmission and the first transmission of the transport block configured by the MAC message or RRC message or DCI.

In one embodiment, the response information corresponding to each transmission period is represented by a 1-bit in the DCI. If the response information includes a correct response, the correct response indicates that the corresponding transport block is received and demodulated correctly by the first communication device, which is the ACK. The error response indicates that the corresponding transport block is received by the first communication device but demodulated incorrectly, which is the NACK, or the error response indicates that the corresponding transport block is not received by the first communication device, which means that there is a discontinuous transmission (DTX).

In another embodiment, the response information corresponding to each transmission period is represented by a 2-bit in the DCI. If the response information includes a correct response, the correct response indicates that the corresponding transport block is received and demodulated correctly by the first communication device, which is equivalent to the ACK. The error response includes the following three indications.

The error response indicates that the transport block is received by the first communication device but demodulated incorrectly, and the first communication device does not send the uplink grant of the corresponding transport block to the second communication device, which is the NACK1.

The error response indicates that the transport block is received by the first communication device but demodulated incorrectly, the first communication device sends the uplink grant of the corresponding transport block to the second communication device within a preset time, and the second communication device does not need to perform autonomous retransmission, but blindly detects the uplink grant and then retransmits the transport block according to the instruction of the uplink grant, which is the NACK2.

The error response indicates that the corresponding transport block is not received by the first communication device, which is DTX.

Through the retransmission method provided in the embodiment, the second communication device can obtain explicit response information.

Embodiment Five

Figure 6:
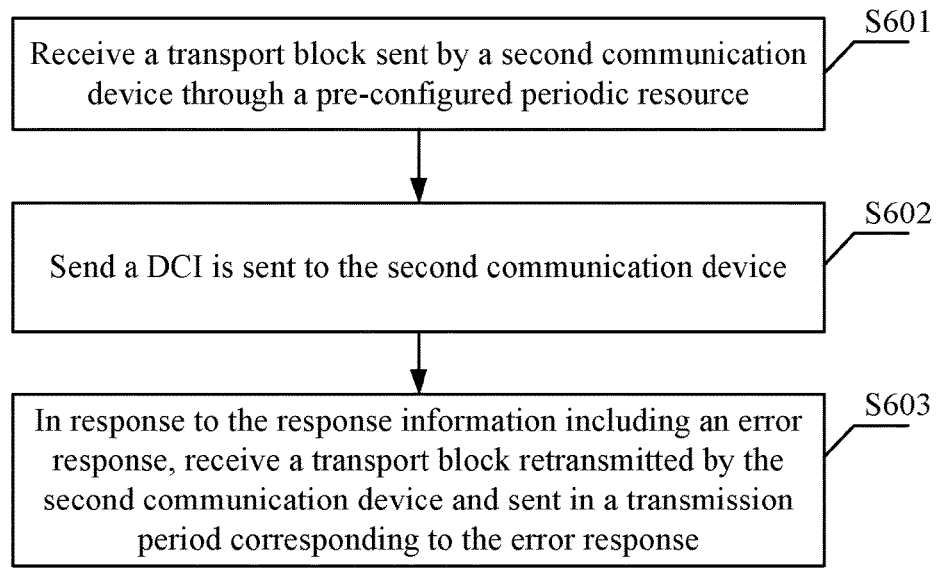
FIG. 6 is a flowchart of a retransmission method according to Embodiment five of the present disclosure.

The embodiment further provides a retransmission method. The method is applied to a first communication device, and with reference to FIG. 6, includes the steps described below.

In S601, a transport block sent by a second communication device through a pre-configured periodic resource is received.

In S602, a DCI is sent to the second communication device.

The DCI includes response information corresponding to N adjacent transmission periods in the time domain, and N is an integer greater than or equal to 1. That is, the N pieces of response information corresponding to the N transmission periods are collectively carried in one DCI. In particular, when N is greater than or equal to 2, communication resources may be relatively saved.

In S603, in response to the response information including an error response, a transport block retransmitted by the second communication device and sent in a transmission period corresponding to the error response is received.

Specifically, the start transmission period of the N transmission periods in the embodiment is determined in one of the following manners.

In manner 1, a transmission period corresponding to a transport block whose process index takes a remainder of N to be (N−1) in received transport blocks is determined as the start transmission period.

In manner 2, in response to detecting a PUSCH of the second communication device in a transmission period and detecting no PUSCH of the second communication device in (N−1) transmission periods in front of the transmission period, the transmission period is determined as the start transmission period.

In manner 3, in response to detecting the PUSCH of the second communication device within a transmission period and detecting no PUSCH of the second communication device from a first transmission period of the period resource to the transmission period, the transmission period is determined as the start transmission period.

Figure 7:
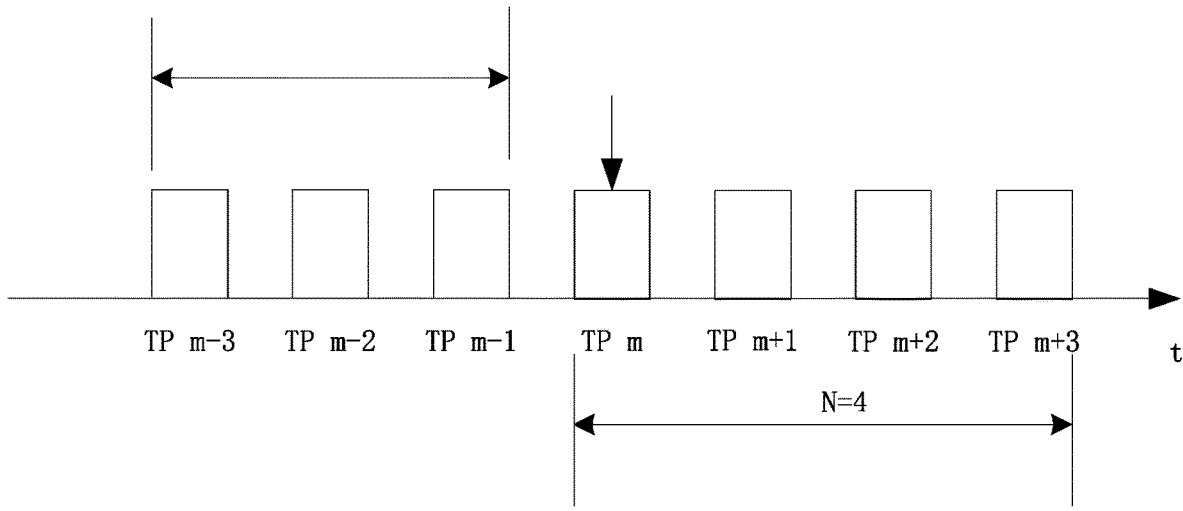
FIG. 7 is a schematic diagram of a transmission period according to Embodiment five of the present disclosure.

The determination of the start transmission period is illustrated below by using an example of N=4 as an example. With reference to FIG. 7, if the first communication device does not receive the PUSCH of the second communication device within transmission periods from TP m−3 to TP m−1 but receives the PUSCH of the second communication device in TP m, the first communication device takes TP m as the start TP of a group of N TPs. Then the first communication device feeds back the response information of four TPs from TP m to TP m+3 in DCI when the response information of the group is fed back.

In this manner, in order to make the second communication device clearly know which group of N TPs the response information corresponds to, and in order to make the second communication device know the situation of missed detection of the first communication device, the above problem in this embodiment may be solved by adopting at least one of the following manners.

In manner (1), the DCI sent by the first communication device includes a unique identifier corresponding to a transmission period in a preset location in the N transmission periods. Specifically, a HARQ process identifier (ID) corresponding to a TP in any particular location of a group of N TPs may be added to the DCI, or another indication capable of uniquely determining the TP group within the round-trip time (RTT) may be added to the DCI. For example, with reference to FIG. 7, the DCI further includes, in addition to the response information of a group of four TPs (TP m to TP m+3), a HARQ process ID corresponding to a specific TP, such as the HARQ process ID of the first TP in the group of four TPs or the HARQ process ID of the second TP in the group of four TPs.

For convenience of understanding, the specific situation of preventing missed detection is described herein. Assuming that the second communication device sends PUSCHs in TP m to TP m+3 but the first communication device does not detect the PUSCH in the TPm, for example, the first communication device does not receive the transport block corresponding to the TPm, the second communication device considers that the data transmission starts from the TP m+1.

According to the manner (1), the DCI sent by the first communication device needs to carry the HARQ process ID of a specific TP among N TPs (assuming that the DCI carries the HARQ process ID of the first TP). In condition of the missed detection, the DCI fed back by the first communication device will carry the HARQ process ID of the TP m+1 instead of the HARQ process ID of the TPm. The second communication device, after receiving this DCI, can determine that the first communication device misses the detection of the transport block of the TP m. In this point, the second communication device can retransmit the transport block to the first communication device.

In manner (2), the DCI is sent to the second communication device within a pre-configured timing period that is m transmission periods after N transmission periods, where m is an integer greater than or equal to 1, optionally, m=1.

In the above manner (2), specifically, a timer that can uniquely correspond to a group of N TPs may be configured for the DCI, and the first communication device needs to feed back the response information of the group of N TPs within the timer. For example, the valid time period of the timer is within one TP duration after the expire of the group of N TPs. Alternatively, the manner of synchronous feedback may be adopted, that is, there is a clear pre-determined time relationship between the DCI and the PUSCH transmission. The second communication device may determine which group of N TPs the DCI feedback corresponds to from the time of the DCI feedback.

The N TPs constituting a group may be N TPs on the same component carrier (CC), or may be N TPs on different CCs. For example, with reference to FIG. 8, the second communication device has two CCs, which are respectively configured with the uplink grant-free transmission. The RRC configures N to 4, and TP m and TPm+1 on CC1 and TP n and TP n+1 on CC2 constitute a group of N TPs (N=4). The first communication device uses DCI to collectively feed back response information of TP m and TP m+1 on CC1 and response information of TP n and TP n+1 on CC2.

In one embodiment, the response information corresponding to each transmission period may be represented by a 1-bit in the DCI. If the response information includes a correct response, the correct response indicates that the corresponding transport block is received and demodulated correctly by the first communication device, which is the ACK. The error response indicates that the corresponding transport block is received by the first communication device but demodulated incorrectly, which is the NACK, or the error response indicates that the corresponding transport block is not received by the first communication device, which is DTX. In another embodiment, the response information corresponding to each transmission period is represented by a 2-bit in the DCI. If the response information includes a correct response, the correct response indicates that the corresponding transport block is received and demodulated correctly by the first communication device, which is equivalent to the ACK. The error response includes the following three indications.

The error response indicates that the transport block is received by the first communication device but demodulated incorrectly, and the first communication device does not send the uplink grant of the corresponding transport block to the second communication device, which is the NACK1.

The error response indicates that the transport block is received by the first communication device but demodulated incorrectly, the first communication device sends the uplink grant of the corresponding transport block to the second communication device within a preset time, and the second communication device does not need to perform autonomous retransmission, but blindly detects the uplink grant and then retransmits the transport block according to the instruction of the uplink grant, which is the NACK2.

The error response indicates that the corresponding transport block is not received by the first communication device, which is DTX.

Finally, it is to be noted that the retransmission method provided in the embodiment can be applied to not only the 5G communication system, but also the third generation mobile communication system, the fourth generation mobile communication system, and other communication systems.

Embodiment Six

For better understanding, in the embodiment, the response receiving method and the response sending method will be further specifically described by using an example in which the first communication device is a base station and the second communication device is a terminal.

In order to reduce the delay of uplink data transmission and the overhead of uplink scheduling, the base station configures for the terminal a resource capable of periodically sending a transport block, that is, the period resource mentioned in Embodiment 1 and Embodiment 2. The configuration information of the period resource includes: a transmission period of the resource, a time-frequency location, a pilot configuration, a repetition number, a coding and modulation scheme, a maximum number of processes, and the like. Regardless of spatial multiplexing, the terminal may send one transport block using the resource within a transmission period. Assuming that the terminal sends a transport block (TB) using one resource, the process index k of the transport block may be determined according to the following formula: k=floor (X/P) mod K.

In the above formula, floor (x) denotes rounding x down, mod denotes the modulo operation, K is the maximum number of processes configured by the base station for the preceding resources, P is the period configured by the base station for the preceding resources, and X=frame index*number of intra-frame slots*number of intra-slot symbols+intra-frame slot index*number of intra-slot symbols+intra-slot symbol index, where the intra-frame slot index corresponds to the symbol index of the first symbol of the transport block in the slot.

Assuming that the frame index is 0, the number of intra-frame slots is 10, the number of intra-slot symbols is 10, K is 3, and P is 4 symbols, the terminal may send the transport block in the location on TB1 to TB7, as shown in FIG. 9. According to the above formula, it can be found that the corresponding process indexes of TB1 to TB7 are 0, 1, 2, 0, 1, 2, 2, and 0, respectively.

In the embodiment, the base station pre-configures for the terminal a period resource capable of periodically sending a transport block and a timing period T1, and it is assumed that the terminal sends a transport block with a process index of k using the period resource.

At the terminal side, the terminal sends the transport block and starts timing at a time point corresponding to the transport block for the duration of T1. In the first example, the terminal does not send a new transport block using the same resource as the process index of transport block within the time T1 corresponding to the transport block, that is, within a timing period T1 corresponding to the transport block. Within the time T1, if the terminal detects an uplink grant corresponding to the transport block and instructing the terminal to retransmit the transport block, or if the terminal detects an error response such as the NACK or the DTX corresponding to the transport block, the terminal restarts the timing. Within the time T1, the terminal still does not send a new transport block using the same resource as the process index of the transport block. As shown in FIG. 9, assuming that T is 14 symbols, the terminal sends a transport block (TB1) on symbols 0 and 1 of the slot 0 with the frame index of 0, and the terminal receives an uplink grant or NACK on the symbol 0 of the slot 1 with the frame index of 0. Since the time corresponding to TB4 is within the time T1 corresponding to the transport block and the time corresponding to TB7 is within the time T1 corresponding to the preceding uplink grant or NACK, the terminal does not use these resources (the period resources corresponding to TB4 and TB7) to send a new transport block even if the terminal needs to send the new transport block. The terminal may retransmit TB1 by using the resource corresponding to TB4 and the resource corresponding to TB7 on the premise that the above resources do not collide with the resources indicated by the uplink grant or NACK.

In a first example, within the time T1 corresponding to the transport block, if the correct response corresponding to the transport block is detected, that is, the ACK information is detected, or if the ACK information or the error response NACK information are not detected, the terminal continues timing. Within the time T1, the terminal does not send a new transport block using the same resource as the process index k of the transport block. After the time T1 expires, the terminal may send the new transport block using the same resource as the process index k of the transport block. As shown in FIG. 9, assuming that T is 16 symbols, the terminal sends a transport block (TB1) on symbols 0 and 1 of the slot 0 with the frame index of 0, and the terminal receives an ACK signal on the symbol 4 of the slot 0 with the frame index of 0.

Since the time domain location corresponding to TB4 is within the time T1 corresponding to TB1, the terminal does not use the resource corresponding to TB4 to send the new transport block. Conversely, since the time domain location corresponding to the TB7 is after the time T1, if the terminal needs to send new data, the terminal may send the new data on the resource corresponding to TB7. Through the method in this example, the terminal can avoid the problem that the base station misses detecting the transport block sent by the terminal while the terminal mistakenly thinks that the base station detects the transport block correctly in the related art.

Meanwhile, the solution provided in this example can effectively solve the problem of process number blurriness in the following cases.

The terminal incorrectly detects that there is the ACK information, which will cause the problem of process blurriness. As shown in FIG. 9, the terminal incorrectly detects the ACK information corresponding to TB1 (for example, the base station does not send the ACK information or sends the NACK information), and then sends a new transport block on TB4. If both TB1 and TB4 detect an error, even if the base station sends NACK information due to the existence of this error and the terminal correctly detects this NACK information, the base station and the terminal may still have different understandings.

In a third example, within the time T1 corresponding to the transport block, if the ACK information corresponding to the transport block is detected, the terminal stops timing. After the timing is stopped, the terminal sends a new transport block using the same resource as the process index of the transport block.

In a fourth example, if the terminal detects an uplink grant, the terminal retransmits a transport block whose process index is k according to the instruction of the uplink grant. Before the terminal detects the ACK signal, the terminal does not use the resource whose process index is k in the resources configured by the base station to send the new transport block but may use the resource to retransmit the transport block. After the terminal detects the ACK signal, the terminal may use the resource whose process index is k in the resources configured by the base station to send the new transport block.

For the method in which the terminal may send data using the resource configured by the base station at intervals of certain periods, a specific method for sending the ACK information is provided herein. The method for sending the ACK information provided by this example includes the following step.

The base station allocates a monitoring period of ACK information to the terminal, allocates one or more sequences carrying the ACK information in the monitoring period and a plurality of resources capable of sending the one or more sequences. The one or more sequences have a pre-defined correspondence with the process index corresponding to the transport block sent by the terminal. Furthermore, the number of the preceding sequences is equal to the maximum number of processes configured by the base station. At this point, each sequence has a pre-defined one-to-one correspondence with the process index. For a sequence corresponding to a certain process index, the base station may map and send a sequence on one or more of a plurality of resources within one monitoring period.

As shown in FIG. 10, the base station allocates ACK sequences corresponding to processes 0, 1, and 2 (represented as process 0 ACK sequence, process 1 ACK sequence, and process 2 ACK sequence in FIG. 10) and a plurality of resources capable of sending the ACK sequences. In FIG. 10, the process 0 ACK sequence may be sent on the resources 0, 1, 2, and 3 (the base station may select one of the resources for sending the process 0 ACK sequence), the process 1 ACK sequence may be sent on the resources 0, 1, 2, and 3, and the process 2 ACK sequence may be sent on the resources 2 and 3. The resources corresponding to the process 0 ACK sequence and the process 1 ACK sequence are completely shared, and the resources corresponding to the process 0 ACK sequence and the process 1 ACK sequence and the resources corresponding to the process 2 ACK sequence are partially shared.

Furthermore, the ACK sequence corresponding to a certain process is a pseudo-random sequence, and the sequences used when this pseudo-random sequence is sent on different resources are different, but these sequences have the same initialization parameters and generator polynomials.

The terminal may detect the ACK information in a plurality of resource locations allocated by the base station according to the ACK sequence monitoring period configured by the base station. As long as the ACK information is detected on one resource, it is considered that the transport block whose process index corresponds to the ACK information is correctly detected. The above methods can solve the above problems in a limited manner, and have many advantages such as capable of improving base station scheduling flexibility and terminal ACK information detection performance.

Embodiment Seven

Figure 11:
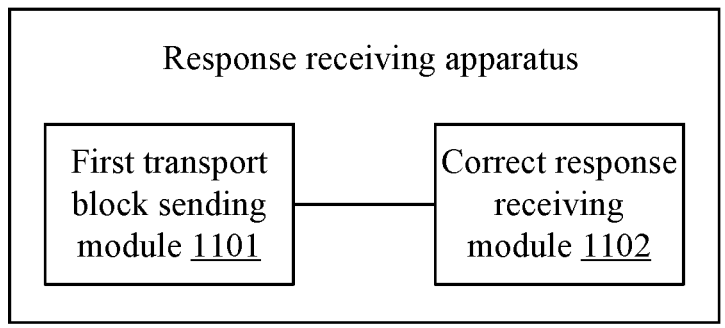
FIG. 11 is a structural diagram of a response receiving apparatus according to Embodiment seven of the present disclosure.

The embodiment of the present disclosure provides a response receiving apparatus. With reference to FIG. 11, the apparatus is applied to the second communication device and includes a first transport block sending module 1101 and a correct response receiving module 1102. The first transport block sending module 1101 is configured to send a transport block to a first communication device through a pre-configured period resource. The correct response receiving module 1102 is configured to receive a correct response corresponding to the transport block and sent by the first communication device on a pre-configured correct response resource.

The period resource in the embodiment may be configured by the first communication device for the second communication device, and the second communication device may send a transport block to the first communication device in a transmission period corresponding to the period resource.

It is to be noted that in the embodiment of the present disclosure, the first communication device may be a base station, and the second communication device may be a terminal, or the first communication device may be a terminal, and the second communication device may be a base station.

Specifically, the correct response sent by the first communication device may be acquired by detecting the transport block. Therefore, if the detection result is incorrect, the second communication device may further receive an error response sent by the first communication device. It is to be noted that the error response in the embodiment may be any response sent by the first communication device to the second communication device that indicates that the transport block is not correctly detected by the first communication device.

When the second communication device receives the correct response, it can be determined through a determination module that the transport block corresponding to the correct response is correctly detected by the first communication device. Then the second communication device does not need to retransmit the transport block corresponding to the correct response so that the waste of resources can be reduced.

In a first example, timing may be started through a timing module at a time corresponding to the transport block, and in response to detecting the correct response corresponding to the transport block within a preset timing period T1, the timing is continued, and a new transport block is prohibited from being sent to the first communication device through the period resource having a same process index of the transport block within the preset timing period T1. Of course, after the end of the preset timing period T1, a new transport block may be allowed to be sent to the first communication device through the period resource having the same process index of the transport block.

T1 in the embodiment may be arbitrarily set, for example, T1 may be 14 symbols, 16 symbols, or the like.

In a second example, timing may be started through the timing module at a time corresponding to the transport block, and in response to detecting the correct response corresponding to the transport block within a preset timing period T1, the timing is stopped, and a new transport block is allowed to be sent to the first communication device through the period resource having a same process index of the transport block.

In a third example, timing is started through the timing module at a time corresponding to the transport block. In response to not detecting the correct response and an error response corresponding to the transport block within a preset timing period T1, the timing is continued, and a new transport block is prohibited from being sent to the first communication device through the period resource having a same process index of the transport block is prohibited within the preset timing period T1. But the transport block may be allowed to be re-sent to the first communication device through the period resource having the same process index of the transport block. Of course, after the end of the preset timing period T1, a new transport block may be allowed to be sent to the first communication device through the period resource having the same process index of the transport block, or if this transport block has not been retransmitted within the preceding preset timing period T1, this transport block may be re-sent to the first communication device through the period resource corresponding to the period resource having the same process index of the transport block or a period resource corresponding to another process index after the end of the preset timing period T1.

In a fourth example, timing is started through the timing module at a time corresponding to the transport block. In response to detecting an error response corresponding to the transport block within a preset timing period T1, the timing is re-started, and a new transport block is prohibited from being sent to the first communication device through the period resource having a same process index of the transport block within the re-timed preset timing period T1. But the transport block may be allowed to be re-sent to the first communication device through the period resource having the same process index of the transport block. Of course, after the end of the preset timing period T1, a new transport block may be allowed to be sent to the first communication device through the period resource having the same process index of the transport block.

It is to be noted that the time corresponding to the transport block mentioned in the embodiment may be any one of the following times:
 a sending start time of the transport block;
 a sending end time of the transport block;
 a generation time of the transport block; or
 a generation time of a protocol data unit corresponding to the transport block.

In a first embodiment, the correct response receiving module 1102 may receive a DCI sent by the first communication device on the pre-configured correct response resource. The correct response is carried in the DCI, and one DCI includes one correct response. The correct response is represented by a HARQ process index field in the DCI and at least one of a resource allocation field, a redundancy version field, a coding and modulation field, a new data indication field, or a transmit power control field in the DCI. The HARQ process index field is the process index of the transport block.

Specifically, when a correct response is represented, all bits of the resource allocation field in the DCI are 1 or 0, all bits of the redundancy version field are 1, and all bits of the coding and modulation field are 0; or, all bits of the resource allocation field are 1 or 0, all bits of the redundancy version field are 0, and all bits of the coding and modulation field are 0; or, all bits of the resource allocation field are 1 or 0, all bits of the redundancy version field are 1, and all bits of the coding and modulation field are 1; or, all bits of the resource allocation field are 1 or 0, and all bits of the redundancy version field are 1; or, all bits of the resource allocation field are 1 or 0, and all bits of the redundancy version field are 0.

Of course, in other embodiments, a correct response may also be represented by setting all bits of the new data indication field to 0 or 1 or setting all bits of the transmit power control field to 0 or 1.

In a second embodiment, the correct response receiving module 1102 may receive a DCI sent by the first communication device on the pre-configured correct response resource. The correct response is carried in the DCI, and one DCI includes a correct response. The correct response is represented by a target bit in the DCI and a HARQ process index field in the DCI. The HARQ process index field is the process index of the transport index.

The target bit in the embodiment may be a 1-bit, a 2-bit, a 3-bit, or the like in the DCI. Specifically, the target bit may be a ninth bit in the DCI, that is, the ninth bit in the DCI indicates the correct response. For example, when the ninth bit is 0, the ninth bit may represent the correct response, and when the ninth bit is 1, the ninth bit may represent the error response.

In a third embodiment, the correct response receiving module 1102 may receive a correct response sequence sent by the first communication device on the pre-configured correct response resource.

After the second communication device receives the correct response sequence, the second communication device may determine, according to the pre-configured correspondence between the correct response sequence and the process index of the second communication device, that the transport block corresponding to the process index corresponding to the correct response sequence is correctly detected by the second communication device.

Finally, it is to be noted that the functions corresponding to the first transport block sending module 1101, the correct response receiving module 1102, the determination module, and the timing module in the embodiment may be implemented by a processor executing the corresponding programs stored in a memory.

Through the response receiving apparatus provided by the embodiment, it can be determined, based on the received correct response, that the transport block corresponding to the correct response is correctly detected by the first communication device, thereby preventing the first communication device from missing detecting the transport block and the second communication device from recognizing that the transport block is correctly detected.

Embodiment Eight

Figure 12:
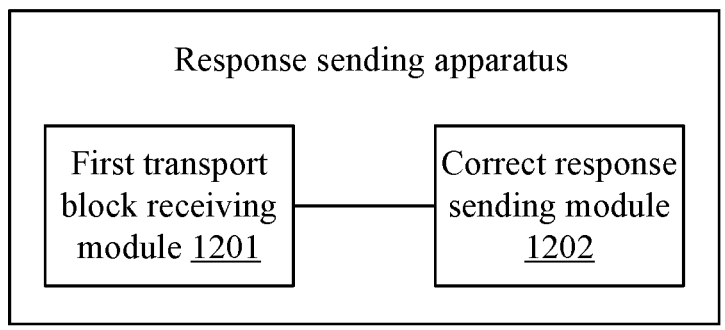
FIG. 12 is a structural diagram of a response sending apparatus according to Embodiment eight of the present disclosure.

The embodiment of the present disclosure provides a response sending apparatus. With reference to FIG. 12, the apparatus is applied to the first communication device and includes a first transport block receiving module 1201 and a correct response sending module 1202. The first transport block receiving module 1201 is configured to receive a transport block sent by a second communication device through a pre-configured period resource. The correct response sending module 1202 is configured to send a correct response corresponding to the transport block to the second communication device on a pre-configured correct response resource.

The first communication device may send the correct response corresponding to the transport block to the second communication device after the transport block is correctly detected.

It is to be noted that the first communication device may further configure the maximum number K of processes for the second communication device and configure a corresponding transmission period P for the period resource configured for the second communication device, where K is an integer greater than or equal to 1, and P is greater than 0. At this point, the first communication device may send the correct response corresponding to the transport block to the second communication device within K*P time after the transport block is detected.

In a first embodiment, the correct response sending module 1202 may send a DCI to the second communication device on the pre-configured correct response resource, where the correct response is carried in the DCI. Furthermore, a HARQ process index field in the DCI is set to a process index of the transport block, and at least one of a resource allocation field, a redundancy version field, a coding and modulation field, a new data indication field, or a transmit power control field in the DCI is set to represent the correct response.

Specifically, at least one of the resource allocation field, the redundancy version field, the coding and modulation field, the new data indication field or the transmit power control field in the DCI is configured in the following manner: setting all bits of the resource allocation field to 1 or 0, setting all bits of the redundancy version field to 1, and setting all bits of the coding and modulation field to 0; setting all bits of the resource allocation field to 1 or 0, setting all bits of the redundancy version field to 0, and setting all bits of the coding and modulation field to 0; setting all bits of the resource allocation field to 1 or 0, setting all bits of the redundancy version field to 1, and setting all bits of the coding and modulation field to 1; setting all bits of the resource allocation field to 1 or 0, and setting all bits of the redundancy version field to 1; or setting all bits of the resource allocation field to 1 or 0, and setting all bits of the coding and modulation field to 0.

Of course, in other embodiments, a correct response may also be represented by setting all bits of the new data indication field to 0 or 1 or setting all bits of the transmit power control field to 0 or 1. The reverse representation of the correct response can be used for representing the error response.

It is to be noted that the operation of setting all bits of the resource allocation field to 1 or 0 ma specifically include: in response to a resource allocation method corresponding to the resource allocation field in the DCI being a bitmap, setting all bits of the resource allocation field to 0, and in response to the resource allocation method corresponding to the resource allocation field in the DCI being not a bitmap, setting all bits of the resource allocation field to 1.

In a second embodiment, the correct response sending module 1202 may further send a DCI to the second communication device on the pre-configured correct response resource, where the correct response is carried in the DCI. Furthermore, the correct response is represented by setting the target bit in the DCI by setting the HARQ process index field in the DCI as the process index of the transport block.

The target bit in the embodiment may be a 1-bit, a 2-bit, a 3-bit, or the like in the DCI. Specifically, the target bit may be a ninth bit in the DCI, that is, the ninth bit in the DCI is set to represent the correct response. For example, the ninth bit of the DCI may be set to 1 to represent the correct response, and the ninth bit of the DCI may be set to 0 to represent the error response. It is to be noted that when some fields or the target bit in the DCI are used to represent the response information such as ACK and NACK, the number of bits included in the DCI carrying the ACK information may be equal to that of the DCI carrying the NACK. The HARQ process index field represents the process index corresponding to the transport block, and other fields are set to a first specified value (for example, "0") or not defined (which may be "0" or "1"). If the some fields or the target bit in the DCI represent the NACK, the preceding bits are set to a second specified value (for example, "1").

For the preceding two embodiments, the DCI sent by the first communication device to the second communication device may be a DCI scrambled by a CS-RNTI.

In a third embodiment, the correct response may be represented by the correct response sequence, and the correct response sending module 1202 may further determine a correct response sequence corresponding to the process index of the transport block and a correct response resource for sending the correct response sequence, map the correct response sequence to the correct response resource for sending to the second communication device.

In the third embodiment, the first communication device may configure a monitoring period for the second communication device to monitor whether the correct response is received, where the monitoring period includes a correct response sequence for representing the correct response and a correct response resource for sending the correct response sequence.

Optionally, in this embodiment, the first communication device may send response information within T1 time after the transport block sent by the terminal is detected. The response information includes one of a correct response and an error response.

The scenario in the third embodiment described above will be further described below.

The correct response sequence configured for the second communication device may be in a one-to-one correspondence to the process index of the second communication device. At this point, the number of correct response sequences is equal to the maximum number of processes configured by the first communication device for the second communication device.

The monitoring period of the correct response configured for the second communication device may be equal to a monitoring period of a PDCCH configured for the second communication device.

When at least two correct response resources for sending the correct response sequence are configured for the first communication device, the plurality of correct response resources may include the same number of REs.

When at least two correct response resources for sending the correct response sequence are configured for the first communication device, the at least two correct response resources may include the same number of time domains, and the plurality of correct response resources may include the same number of sub-carriers.

When at least two correct response sequences are configured for the second communication device, the at least two correct response sequences may share one correct response resource.

The correct response resource may be composed of REGs.

For the scenario in the third embodiment, the correct response sending module 1202 may map the correct response sequence to the correct response resource in one of the following mapping manners.

In manner 1, in response to the correct response resource being composed of one REG, the correct response sequence is mapped to the REG in a preset order of frequency sizes, where during the mapping, the correct response sequence is mapped to a resource used for sending a reference signal in the REG and to a resource not used for sending the reference signal in the REG. The preset order of frequency sizes mentioned in the embodiment may be a descending order of frequencies, an ascending order of frequencies, or another order.

In manner 2, in response to the correct response resource being composed of one REG, the correct response sequence is mapped to the REG in a preset order of frequency sizes, where during the mapping, a resource used for sending a reference signal in the REG is skipped. Similarly, the preset order of frequency sizes mentioned in this manner may be a descending order of frequencies, an ascending order of frequencies, or another order.

In manner 3, in response to the correct response resource being composed of at least two REGs and the at least two REGs being in different time domains, the correct response sequence is mapped to the at least two REGs in an order of the time domain followed by the frequency domain or in an order of a frequency domain followed by a time domain, where during the mapping, the correct response sequence is mapped to a resource used for sending a reference signal in the at least two REGs and to a resource not used for sending the reference signal in the at least two REGs.

In manner 4, in response to the correct response resource being composed of at least two REGs and the at least two REGs being in different time domains, the correct response sequence is mapped to the at least two REGs in an order of the time domain followed by the frequency domain or in an order of a frequency domain followed by a time domain, where during the mapping, a resource used for sending a reference signal in the at least two REGs is skipped.

In manner 5, in response to the correct response resource being composed of at least two REGs and the at least two REGs being continuous in the time domain or the frequency domain, the correct response sequence is mapped to the at least two REGs in an order of the time domain followed by the frequency domain or in an order of the frequency domain followed by the time domain, where during the mapping, the correct response sequence is mapped to a resource used for sending a reference signal in the at least two REGs and to a resource not used for sending the reference signal in the at least two REGs.

In manner 6, in response to the correct response resource being composed of at least two REGs and the at least two REGs being discontinuous in the time domain and the frequency domain, the correct response sequence is mapped to the at least two REGs in an order of the time domain followed by the frequency domain or in an order of the frequency domain flowed by the time domain, where during the mapping, a resource used for sending a reference signal in the at least two REGs is skipped.

It is to be noted that in the above multiple manners, in the case that the resource used for sending the reference signal on the REG is skipped during the mapping, if there is a resource corresponding to the reference signal during mapping, the element constituting the correct response sequence may be automatically mapped to the next available resource, or the element may be discarded. In the embodiment, the correct response resource may correspond to a resource occupied by one PDCCH in the PDCCH search space of the second communication device. Of course, in other embodiments, the correct response resource may correspond to resources occupied by a plurality of PDCCHs in the PDCCH search space of the second communication device.

In one embodiment, the correct response sending module 1202 may map the correct response sequence to the resource occupied by the PDCCH according to a type of mapping of a CCE in the resource occupied by the one PDCCH to the REG.

Specifically, in response to the type of the mapping of the CCE to the REG being an interleaving type, the correct response sending module 1202 may map the correct response sequence to a REG in a candidate location of the PDCCH, where during the mapping, a resource used for sending a reference signal in the REG is skipped. In response to the type of the mapping of the CCE to the REG being a non-interleaving type, the correct response sending module 1202 maps the correct response sequence to a REG in a candidate location of the PDCCH, where during the mapping, the correct response sequence is mapped to the resource used for sending the reference signal in the REG and to a resource not used for sending the reference signal in the REG. Of course, in other embodiments, in response to the mapping type from the CCE to the REG being a non-interleaved type, the correct response sequence may be mapped to the REG in the candidate location of the PDCCH, where during the mapping, the resource used for sending the reference signal on the REG is skipped. In response to the mapping type from the CCE to the REG being an interleaved type, the correct response sequence may be mapped to the REG in the candidate location of the PDCCH, where during the mapping, the correct response sequence may be mapped to the resource used for sending the reference signal on the REG and to the resource not used for sending the reference signal on the REG.

In another embodiment, when the correct response resource corresponds to a resource occupied by one PDCCH in the PDCCH search space of the second communication device, the correct response sending module 1202 may acquire aggregation levels corresponding to a plurality of PDCCHs in the PDCCH search space of the second communication device, and map the correct response sequence to the resource occupied by the PDCCH according to the aggregation levels corresponding to the plurality of PDCCHs.

It is to be noted that the resource occupied by one PDCCH includes p CCEs, where p is one of {1, 2, 4, 8, 16, 32}, and accordingly, the aggregation level of this PDCCH is referred to as p. In the embodiment, the aggregation level may be configured by the first communication device and notified to the second communication in advance.

Specifically, the correct response sending module 1202 may select an aggregation level from the aggregation levels corresponding to the plurality of PDCCHs. In response to the aggregation level being less than or equal to a preset threshold, the correct response sequence is mapped to a first-type resource in the resource occupied by the PDCCH, or the correct response sequence is mapped to the first-type resource and a second-type resource in the resource occupied by the PDCCH. In response to the aggregation level being greater than the preset threshold, the correct response sequence is mapped to the second-type resource in the resource occupied by the PDCCH. The first-type resource is a resource not corresponding to a reference signal in the resource occupied by the PDCCH, and the second-type resource is a resource corresponding to the reference resource in the resource occupied by the PDCCH.

The preset threshold in the embodiment can be flexibly set by the developer.

Specifically, the manner of selecting the aggregation level from the aggregation levels corresponding to the plurality of PDCCHs includes, but is not limited to, one of the following manners.

The maximum aggregation level is selected from the aggregation levels corresponding to the plurality of PDCCHs.

The minimum aggregation level is selected from the aggregation levels corresponding to the plurality of PDCCHs.

When the number of corresponding PDCCHs in the search space is R, an aggregation level ranking in Qth bit is selected from the aggregation levels corresponding to the plurality of PDCCHs, where R and Q are integers, R is greater than or equal to 3, (R−Q) is greater than zero and less than (R−1).

It is to be noted that the ranking may be performed in descending order, or may be performed in ascending order.

Finally, it is to be noted that the functions corresponding to the first transport block receiving module 1201 and the correct response sending module in the embodiment may be implemented by a processor executing the corresponding programs stored in a memory.

Embodiment Nine

Figure 13:
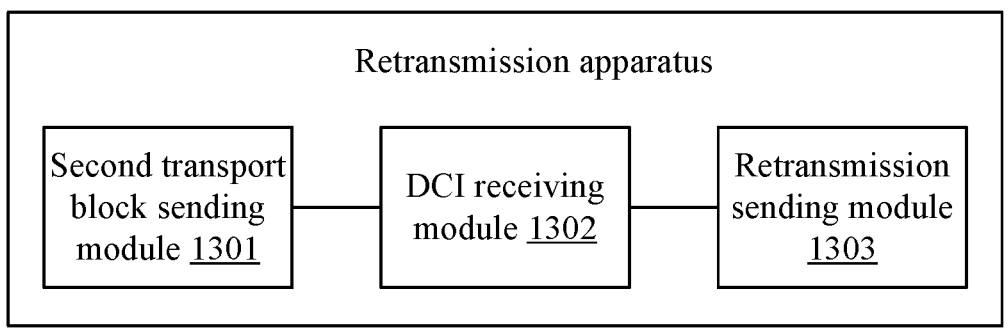
FIG. 13 is a structural diagram of a retransmission apparatus according to Embodiment nine of the present disclosure.

With reference to FIG. 13, the embodiment provides a retransmission apparatus. The apparatus is applied to a second communication device and includes a second transport block sending module 1301, a DCI receiving module 1302, and a retransmission sending module 1303. The second transport block sending module 1301 is configured to send a transport block to a first communication device through a pre-configured period resource. The DCI receiving module 1302 is configured to receive a DCI sent by the first communication device, where the DCI includes response information corresponding to N adjacent transmission periods in the time domain. The retransmission sending module 1303 is configured to, in response to the response information including an error response, retransmit a transport block sent in a transmission period corresponding to the error response to the first communication device.

The period resource in the embodiment may be configured by the first communication device for the second communication device, and the second communication device may send a transport block to the first communication device in a transmission period corresponding to the period resource. In the embodiment, N is an integer greater than or equal to 1. That is, the N pieces of response information corresponding to the N transmission periods are collectively carried in one DCI. In particular, when N is greater than or equal to 2, communication resources may be relatively saved. Specifically, the first communication device in the embodiment may send an error response and an uplink grant to the second communication device. Specifically, the first communication device may send an error response to the second communication device when detecting a transport block error and send an uplink grant. In the embodiment, the retransmission sending module 1303 may perform retransmission in one of the following manners.

In manner 1, if the second communication device receives the uplink grant for scheduling the retransmission of the transport block within the pre-configured timer time, the second communication device retransmits the corresponding transport block according to the instruction of the uplink grant. Within the pre-configured timer time, if the second communication device does not receive the uplink grant but receives the DCI, the retransmission sending module 1303 autonomously retransmits the transport block receiving the error response after the pre-configured timer time expires.

In manner 2, within the pre-configured timer time, if the second communication device first receives the DCI, the second communication device autonomously retransmits the corresponding transport block receiving the error response. Specifically, the second communication device does not need to wait for the expiry of the timer time, and may autonomously retransmit the transport block corresponding to the error response when receiving the DCI. Of course, the second communication device may also determine the retransmission occasion according to another manner. If the second communication device subsequently receives the uplink grant corresponding to the transport block, the retransmission sending module 1303 may choose to retransmit the transport block again according to the instruction of the uplink grant or ignore the uplink grant.

In manner 3, within the pre-configured timer time, if the second communication device first receives the uplink grant for scheduling the retransmission of the transport block, the second communication device retransmits the corresponding transport block according to the instruction of the uplink grant. If the second communication device subsequently receives the DCI, the retransmission sending module 1303 may choose to retransmit the transport block corresponding to the error response in the DCI again or may choose not to retransmit the transport block corresponding to the error response in the DCI.

In manner 4, within the pre-configured timer time, the second communication device does not receive the uplink grant corresponding to a transport block actually transmitted and does not receive the DCI corresponding to this transport block. The retransmission sending module 1303 may autonomously retransmit this transport block after the timer time expires.

It is to be noted that the timing start time corresponding to the timer in the embodiment may be the time at which the second communication device sends the corresponding transport block.

There are various manners of autonomous retransmission in the embodiment, including but not limited to one of the following manners.

In manner 1, there is no binding relationship between the autonomous retransmission and the first transmission of the transport block. During autonomous retransmission, the second communication device autonomously selects a period resource and re-sends the transport block as a new transport block. The first communication device cannot associate the autonomous retransmission with the first transmission of the transport block, and thus the autonomous retransmission with the first transmission of the transport block cannot be demodulated in the combined manner but only be demodulated independently.

In manner 2, the binding relationship between the autonomous retransmission and the first transmission of the transport block is configured by a higher layer, for example, by a MAC (physical) layer or an RCC layer, or by a DCI. For example, the timing relationship between the autonomous retransmission and the first transmission of the transport block is configured through a MAC message, an RRC message, or a DCI. The second communication device, after receiving the DCI, autonomously retransmits the transport block sent within the transmission period (TP) corresponding to the corresponding error response. The period resource used for autonomous retransmission is determined according to the timing relationship between the autonomous retransmission and the first transmission of the transport block configured by the MAC message or RRC message or DCI.

In one embodiment, the response information corresponding to each transmission period is represented by a 1-bit in the DCI. If the response information includes a correct response, the correct response indicates that the corresponding transport block is received and demodulated correctly by the first communication device, which is the ACK. The error response indicates that the corresponding transport block is received by the first communication device but demodulated incorrectly, which is the NACK, or the error response indicates that the corresponding transport block is not received by the first communication device, which is the DTX.

In another embodiment, the response information corresponding to each transmission period is represented by a 2-bit in the DCI. If the response information includes a correct response, the correct response indicates that the corresponding transport block is received and demodulated correctly by the first communication device, which is equivalent to the ACK. The error response includes the following three indications.

The error response indicates that the transport block is received by the first communication device but demodulated incorrectly, and the first communication device does not send the uplink grant of the corresponding transport block to the second communication device, which is the NACK1.

The error response indicates that the transport block is received by the first communication device but demodulated incorrectly, the first communication device sends the uplink grant of the corresponding transport block to the second communication device within a preset time, and the second communication device does not need to perform autonomous retransmission, but blindly detects the uplink grant and then retransmits the transport block according to the instruction of the uplink grant, which is the NACK2.

The error response indicates that the corresponding transport block is not received by the first communication device, which is DTX.

Finally, it is to be noted that the functions corresponding to the second transport block sending module 1301, the DCI receiving module 1302, and the retransmission sending module 1303 in the embodiment may be implemented by a processor executing the corresponding programs stored in a memory.

Embodiment Ten

Figure 14:
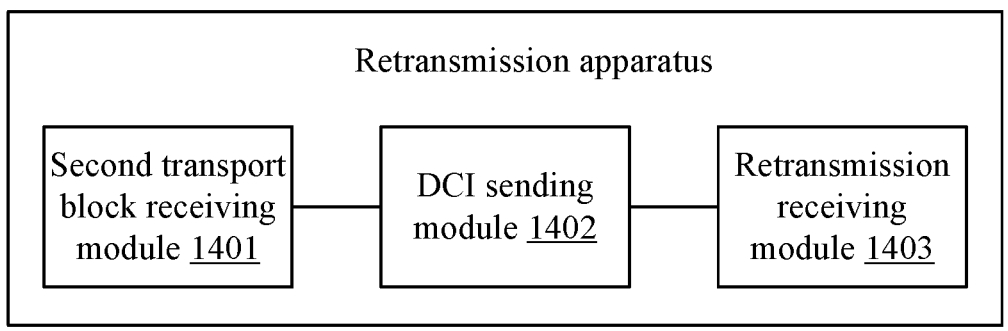
FIG. 14 is a structural diagram of a retransmission apparatus according to Embodiment ten of the present disclosure.

The embodiment further provides a retransmission apparatus. The apparatus is applied to a first communication device, and with reference to FIG. 14, includes a second transport block receiving module 1401, a DCI sending module 1402, and a retransmission receiving module 1403. The second transport block receiving module 1401 is configured to receive a transport block sent by a second communication device through a pre-configured period resource. The DCI sending module 1402 is configured to send a DCI to the second communication device.

The retransmission receiving module 1403 is configured to, in response to the response information including an error response, receive a transport block retransmitted by the second communication device and sent in a transmission period corresponding to the error response.

The DCI includes response information corresponding to N adjacent transmission periods in the time domain, and N is an integer greater than or equal to 1. That is, the N pieces of response information corresponding to the N transmission periods are collectively carried in one DCI. In particular, when N is greater than or equal to 2, communication resources may be relatively saved.

Specifically, the start transmission period of the N transmission periods in the embodiment is determined in one of the following manners.

In manner 1, a transmission period corresponding to a transport block whose process index takes a remainder of N to be (N−1) in received transport blocks is determined as the start transmission period.

In manner 2, in response to detecting a PUSCH of the second communication device in a transmission period and detecting no PUSCH of the second communication device in (N−1) transmission periods in front of the transmission period, the transmission period is determined as the start transmission period.

In manner 3, in response to detecting the PUSCH of the second communication device within a transmission period and detecting no PUSCH of the second communication device from a first transmission period of the period resource to the transmission period, the transmission period is determined as the start transmission period.

In order to make the second communication device clearly know which group of N TPs the response information corresponds to, and in order to make the second communication device know the situation of missed detection of the first communication device, the above problem in this embodiment may be solved by adopting at least one of the following manners.

In manner (1), the DCI sent by the DCI sending module 1402 includes a unique identifier corresponding to a transmission period in a preset location in the N transmission periods. Specifically, a HARQ process identifier (ID) corresponding to a TP in any particular location of a group of N TPs may be added to the DCI, or another indication capable of uniquely determining the TP group within the round-trip time (RTT) may be added to the DCI.

In manner (2), the DCI sending module 1402 sends the DCI to the second communication device within a pre-configured timing period that is m transmission periods after N transmission periods, where m is an integer greater than or equal to 1, optionally, m=1.

The N TPs constituting a group may be N TPs on the same CC or may be N TPs on different CCs.

In one embodiment, the response information corresponding to each transmission period may be represented by a 1-bit in the DCI. If the response information includes a correct response, the correct response indicates that the corresponding transport block is received and demodulated correctly by the first communication device, which is the ACK. The error response indicates that the corresponding transport block is received by the first communication device but demodulated incorrectly, which is the NACK, or the error response indicates that the corresponding transport block is not received by the first communication device, which is DTX. In another embodiment, the response information corresponding to each transmission period is represented by a 2-bit in the DCI. If the response information includes a correct response, the correct response indicates that the corresponding transport block is received and demodulated correctly by the first communication device, which is equivalent to the ACK. The error response includes the following three indications.

The error response indicates that the transport block is received by the first communication device but demodulated incorrectly, and the first communication device does not send the uplink grant of the corresponding transport block to the second communication device, which is the NACK1.

The error response indicates that the transport block is received by the first communication device but demodulated incorrectly, the first communication device sends the uplink grant of the corresponding transport block to the second communication device within a preset time, and the second communication device does not need to perform autonomous retransmission, but blindly detects the uplink grant and then retransmits the transport block according to the instruction of the uplink grant, which is the NACK2.

The error response indicates that the corresponding transport block is not received by the first communication device, which is DTX.

Finally, it is to be noted that the functions corresponding to the second transport block receiving module 1401, the DCI sending module 1402, and the retransmission receiving module 1403 in the embodiment may be implemented by a processor executing the corresponding programs stored in a memory.

Embodiment Eleven

Figure 15:
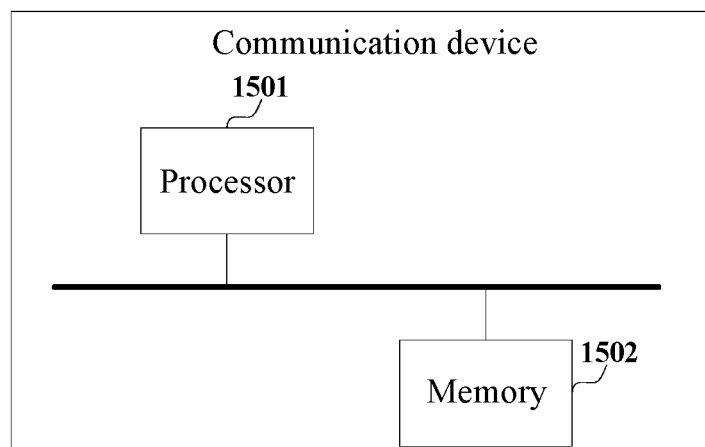
FIG. 15 is a structural diagram of a communication device according to Embodiment eleven of the present disclosure.

The embodiment further provides a communication device. With reference to FIG. 15, the communication device includes a processor 1501 and a memory 1502. The processor 1501 is configured to execute one or more first programs stored in the memory 1502 to implement any one of the response receiving methods in Embodiment one, or the processor 1501 is configured to execute one or more second programs stored in the memory 1502 to implement any one of the retransmission methods in Embodiment four, or the processor 1501 is configured to execute one or more third programs stored in the memory 1502 to implement any one of the response sending methods in Embodiment two, or the processor 1501 is configured to execute one or more fourth programs stored in the memory 1502 to implement any one of the retransmission methods in Embodiment five.

Specifically, the communication device may be a terminal. In this point, optionally, the processor is configured to execute one or more first programs stored in the memory to implement the steps of any one of the response receiving methods in Embodiment one, or the processor is configured to execute one or more second programs stored in the memory to implement any one of the retransmission methods in Embodiment four.

Specifically, the communication device may also be a base station. In this point, optionally, the processor is configured to execute one or more third programs stored in the memory to implement the steps of any one of the response sending methods in Embodiment two, or the processor is configured to execute one or more fourth programs stored in the memory to implement any one of the retransmission methods in Embodiment five.

The embodiment further provides a response system. The system includes a terminal and a base station. The terminal is configured to send a transport block to the base station through a pre-configured period resource. The base station is configured to receive the transport block and send a correct response corresponding to the transport block to the terminal on a pre-configured correct response resource.

The embodiment further provides a retransmission system. The system includes a terminal and a base station. The terminal is configured to send a transport block to the base station through a pre-configured period resource. The base station is configured to send a DCI to the terminal, where the DCI includes response information corresponding to N adjacent transmission periods in the time domain. If the response information includes an error response, the terminal is configured to retransmit a transport block corresponding to the error response and sent within the transmission period to the base station.

The embodiment further provides a storage medium. The storage medium includes volatile and nonvolatile, removable and non-removable media implemented in any method or technology for storage of information such as computer-readable instructions, data structures, program modules, or other data. The computer-readable storage medium includes, but is not limited to, a random access memory (RAM), a read-only memory (ROM), an electrically erasable programmable read-only memory (EEPROM), a flash memory or other memory technology, a compact disc read-only memory (CD-ROM), a digital video disc (DVD) or other optical storage devices, a disk, a magnetic tape or other magnetic storage devices, or any other medium which can be used to store the desired information and which can be accessed by the computer.

The storage medium is configured to store one or more first programs that, when executed by one or more processors, implement the steps of any one of the response receiving methods in Embodiment one, or the storage medium is configured to store one or more second programs that, when executed by one or more processors, implement any one of the retransmission methods in Embodiment four, or the storage medium is configured to store one or more third programs that, when executed by one or more processors, implement any one of the response sending methods in Embodiment two, or the storage medium is configured to store one or more fourth programs that, when executed by one or more processors, implement any one of the retransmission methods in Embodiment five.

The embodiment further provides a computer program (or computer software). The computer program may be disposed in the computer-readable medium and is executed by a computing device to implement at least one step of the methods in Embodiments one to five. The at least one step shown or described can, in some circumstances, be executed in a different order than presented herein.

The embodiment further provides a computer program product. The computer program product includes a computer-readable device having the above computer program stored thereon. The computer-readable device in the embodiment may include the above computer-readable storage medium.

As can be seen, those skilled in the art should appreciate that all or some steps in the methods disclosed above and function modules/units in the systems and apparatuses can be implemented as software (which can be implemented by computer program codes executable by the computing device), hardware, firmware, or suitable combinations thereof. In the implementation in hardware, the division of the function modules/units mentioned in the above description does not necessarily correspond to the division of physical components. For example, one physical component may have a plurality of functions, or one function or step may be executed by several physical components collaboratively. Some physical components or all physical components may be implemented as software executed by a processor such as software executed by a central processing unit, a digital signal processor or a microprocessor, or implemented as hardware, or implemented as an integrated circuit such as a specific integrated circuit.

Additionally, as known by those of ordinary skill in the art, the communication media typically includes computer-readable instructions, data structures, computer program modules, or other data in a modulated data signal such as a carrier wave or other transport mechanism, and includes any information delivery media. Therefore, the present disclosure is not limited to any specific combination of hardware and software.

What is claimed is:

1. A response sending method, applied to a first communication device, comprising:
   receiving a transport block sent by a second communication device through a pre-configured periodic resource; and
   sending an acknowledgement (ACK) message corresponding to the transport block to the second communication device on a pre-configured ACK resources;
   before the receiving the transport block sent by the second communication device through the pre-configured periodic resource, the method further comprises:
   configuring a maximum number K of processes for the second communication device, and configuring a corresponding transmission period P for the periodic resource configured for the second communication device, wherein K is an integer greater than or equal to 1, and P is greater than 0; and
   wherein the sending the ACK message corresponding to the transport block to the second communication device on the pre-configured ACK resource comprises:
   sending the ACK message to the second communication device within K*P time after the transport block is detected.

2. The method of claim 1, wherein the ACK message is carried in a downlink control information (DCI) sent to the second communication device, one piece of the DCI comprises one ACK message, and at least one of a resource allocation field, a redundancy version field, a coding and modulation field, a new data indication field, or a transmit power control field in the DCI is set to indicate the ACK message by setting a hybrid automatic repeat request (HARD) process index field in the DCI to a process index of the transport block.

3. The method of claim 2, wherein at least one of the resource allocation field, the redundancy version field, the coding and modulation field, the new data indication field, or the transmit power control field in the DCI is configured in the following manner:
   setting all bits of the resource allocation field to 1 or 0, setting all bits of the redundancy version field to 1, and setting all bits of the coding and modulation field to 0; or
   setting all bits of the resource allocation field to 1 or 0, setting all bits of the redundancy version field to 0, and setting all bits of the coding and modulation field to 0; or
   setting all bits of the resource allocation field to 1 or 0, setting all bits of the redundancy version field to 1, and setting all bits of the coding and modulation field to 1; or setting all bits of the resource allocation field to 1 or 0, and setting all bits of the redundancy version field to 1; or setting all bits of the resource allocation field to 1 or 0, and setting all bits of the coding and modulation field to 0.

4. The method of claim 3, wherein the setting all bits of the resource allocation field to 1 or 0 comprises:

in response to a resource allocation method corresponding to the resource allocation field in the DCI being a bitmap, setting all bits of the resource allocation field to 0, and in response to the resource allocation method corresponding to the resource allocation field in the DCI being not a bitmap, setting all bits of the resource allocation field to 1.

5. The method of claim 3, wherein the ACK message is carried in the DCI sent to the second communication device, one piece of the DCI comprises one ACK message, and specific bits in the DCI are set to indicate the ACK message by setting the HARQ process index field in the DCI to the process index of the transport block.

6. The method of claim 5, wherein the number of the specific bits is one.

7. The method of claim 1, wherein the sending the ACK message corresponding to the transport block to the second communication device on the pre-configured ACK resource comprises:

sending a DCI scrambled by a configured scheduling radio network temporary identifier (CS-RNTI) to the second communication device.

8. The method of claim 1, wherein before the receiving the transport block sent by the second communication device through the pre-configured period periodic resource, further comprising:

configuring a monitoring period for the second communication device to monitor whether the ACK message is received, wherein the monitoring period comprises an ACK sequence for indicating the ACK message and an ACK resource for sending the ACK sequence; and wherein the sending the ACK message corresponding to the transport block to the second communication device on the pre-configured ACK resource comprises:

mapping an ACK sequence corresponding to a process index of the transport block to the ACK resource to send to the second communication device.

9. The method of claim 8, wherein the ACK sequence configured for the second communication device is in a one-to-one correspondence to a process index of the second communication device.

10. The method of claim 8, wherein the monitoring period of the ACK message is equal to a monitoring period of a physical downlink control channel (PDCCH) configured for the second communication device.

11. The method of claim 8, wherein in response to configuring at least two ACK sequences for the second communication device, the at least two ACK sequences share the ACK resource.

12. The method of claim 8, wherein the ACK resource comprises resource element groups (REGs).

13. The method of claim 12, wherein the mapping the ACK sequence to the ACK resource comprises one of:

in response to the ACK resource being composed of one REG, mapping the ACK sequence to the REG in a preset order of frequency sizes, wherein during the mapping, the ACK sequence is mapped to a resource used for sending a reference signal in the REG and to a resource not used for sending the reference signal in the REG;

in response to the ACK resource being composed of one REG, mapping the ACK sequence to the REG in a preset order of frequency sizes, wherein during the mapping, a resource used for sending a reference signal in the REG is skipped;

in response to the ACK resource being composed of at least two REGs and the at least two REGs being in different time domains, mapping the ACK sequence to the at least two REGs in an order of a time domain followed by a frequency domain or in an order of a frequency domain followed by a time domain, wherein during the mapping, the ACK sequence is mapped to a resource used for sending a reference signal in the at least two REGs and to a resource not used for sending the reference signal in the at least two REGs;

in response to the ACK resource being composed of at least two REGs and the at least two REGs being in different time domains, mapping the ACK sequence to the at least two REGs in an order of a time domain followed by a frequency domain or in an order of a frequency domain followed by a time domain, wherein during the mapping, a resource used for sending a reference signal in the at least two REGs is skipped;

in response to the ACK resource being composed of at least two REGs and the at least two REGs being sequentially continuous in a time domain or in a frequency domain, mapping the ACK sequence to the at least two REGs in an order of the time domain followed by the frequency domain or in an order of the frequency domain followed by the time domain, wherein during the mapping, the ACK sequence is mapped to a resource used for sending a reference signal in the at least two REGs and to a resource not used for sending the reference signal in the at least two REGs; or in response to the ACK resource being composed of at least two REGs and the at least two REGs being discontinuous in a time domain and in a frequency domain, mapping the ACK sequence to the at least two REGs in an order of the time domain followed by the frequency domain or in an order of the frequency domain flowed by the time domain, wherein during the mapping, a resource used for sending a reference signal in the at least two REGs is skipped.

14. The method of claim 12, wherein the ACK resource corresponds to a resource occupied by one PDCCH in a PDCCH search space of the second communication device; and the mapping the ACK sequence corresponding to the process index of the transport block to the ACK resource comprises:

mapping the ACK sequence to the resource occupied by the PDCCH according to a type of mapping of a control channel element (CCE) in the resource occupied by the one PDCCH to the REG.

15. The method of claim 14, wherein the mapping the ACK sequence on the resource occupied by the PDCCH according to the type of the mapping of the CCE in the resource occupied by the one PDCCH to the REG comprises:

in response to the type of the mapping of the CCE to the REG being an interleaving type, mapping the ACK sequence to a REG in a candidate location of the PDCCH, wherein during the mapping, a resource used for sending a reference signal in the REG is skipped; and in response to the type of the mapping of the CCE to the REG being a non-interleaving type, mapping the ACK sequence to a REG in a candidate location of the PDCCH, wherein during the mapping, the ACK sequence is mapped to the resource used for sending the reference signal in the REG and to a resource not used for sending the reference signal in the REG.

16. The method of claim 12, wherein the ACK resource corresponds to a resource occupied by one PDCCH in a PDCCH search space of the second communication device; and the mapping the ACK sequence corresponding to the process index of the transport block to the ACK resource comprises:
  acquiring aggregation levels corresponding to a plurality of PDCCHs in the PDCCH search space of the second communication device; and
  mapping the ACK sequence to the resource occupied by the PDCCH according to the aggregation levels corresponding to the plurality of PDCCHs.

17. The method of claim 16, wherein the mapping the ACK sequence to the resource occupied by the PDCCH according to the aggregation levels corresponding to the plurality of PDCCHs comprises:
  selecting an aggregation level from the aggregation levels corresponding to the plurality of PDCCHs, in response to the aggregation level being less than or equal to a preset threshold, mapping the ACK sequence to a first-type resource in the resource occupied by the PDCCH or mapping the ACK sequence to the first-type resource and a second-type resource in the resource occupied by the PDCCH, and in response to the aggregation level being greater than the preset threshold, mapping the ACK sequence to the second-type resource in the resource occupied by the PDCCH; wherein the first-type resource is a resource not corresponding to a reference signal in the resource occupied by the PDCCH, and the second-type resource is a resource corresponding to the reference resource in the resource occupied by the PDCCH.

18. A communication device, comprising a processor and a memory;
  wherein the processor is configured to execute one or more programs stored in the memory to implement the method of claim 1.

19. A non-transitory storage medium, wherein the storage medium is configured to store one or more programs that, when executed by one or more processors, implement the method of claim 1.

* * * * *